US008927682B2

(12) United States Patent
Baker et al.

(10) Patent No.: US 8,927,682 B2
(45) Date of Patent: *Jan. 6, 2015

(54) FUNCTIONALIZATION OF POLYGLYCOLIDES BY "CLICK" CHEMISTRY

(75) Inventors: Gregory L. Baker, Haslett, MI (US); Milton R. Smith, III, East Lansing, MI (US); Xuwei Jiang, Berkeley, CA (US); Erin B. Vogel, Midland, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 491 days.

This patent is subject to a terminal disclaimer.

(21) Appl. No.: 12/229,544

(22) Filed: Aug. 25, 2008

(65) Prior Publication Data
US 2009/0054619 A1   Feb. 26, 2009

Related U.S. Application Data

(60) Provisional application No. 60/966,042, filed on Aug. 24, 2007, provisional application No. 61/135,679, filed on Jul. 23, 2008.

(51) Int. Cl.
*C08G 63/08* (2006.01)
*C08G 63/82* (2006.01)

(52) U.S. Cl.
CPC .............. *C08G 63/08* (2013.01); *C08G 63/823* (2013.01)
USPC ........... 528/354; 424/400; 525/415; 525/437; 528/184; 528/274; 528/328; 528/357; 528/383; 528/503

(58) Field of Classification Search
USPC ......... 528/354, 357, 184, 328, 274, 383, 503, 528/345, 360; 525/415, 437; 424/400
See application file for complete search history.

(56) References Cited

U.S. PATENT DOCUMENTS

| | | | |
|---|---|---|---|
| 5,625,030 | A | 4/1997 | Williams et al. |
| 6,469,133 | B2 * | 10/2002 | Baker et al. ................... 528/354 |
| 7,375,234 | B2 | 5/2008 | Sharpless et al. |
| 7,763,736 | B2 | 7/2010 | Sharpless et al. |
| 8,394,914 | B2 * | 3/2013 | Baker et al. ................... 528/354 |
| 2001/0044514 | A1 | 11/2001 | Baker et al. |
| 2002/0155092 | A1 * | 10/2002 | Leong et al. ................ 424/78.37 |
| 2005/0201972 | A1 | 9/2005 | Seo et al. |
| 2006/0188486 | A1 | 8/2006 | Carpenter et al. |
| 2007/0020620 | A1 | 1/2007 | Finn et al. |
| 2007/0141363 | A1 | 6/2007 | Acosta et al. |
| 2008/0311412 | A1 | 12/2008 | Fokin et al. |
| 2009/0069561 | A1 | 3/2009 | Fokin et al. |
| 2009/0181402 | A1 | 7/2009 | Finn et al. |
| 2009/0182151 | A1 | 7/2009 | Wu et al. |
| 2009/0306310 | A1 | 12/2009 | Wu et al. |
| 2009/0325292 | A1 | 12/2009 | Baker et al. |
| 2010/0286405 | A1 | 11/2010 | Fokin et al. |

OTHER PUBLICATIONS

Parrish, B. and T. Emrick, Aliphatic polyesters with pendant cyclopentene groups: Controlled synthesis and conversion to poly-ester-graft-PEG copolymers, Macromolecules, 2004, 37(16): p. 5863-5865.
Benabdillah, K.M., et al., Synthesis and characterization of novel degradable polyesters derived from D-gluconic and glycolic acids, Macromolecules, 1999, 32(26): p. 8774-8780.
Trollsas, M., et al., Hydrophilic aliphatic polyesters: Design, synthesis, and ring-opening polymerization of functional cyclic esters, Macromolecules, 2000, 33(13): p. 4619-4627.
Kimura, Y., et al., Ring-Opening Polymerization of 3(S)-[(Benzyloxycarbonyl)Methyl]-1,4-Dioxane-2,5-Dione—A New Route to a Poly(Alpha-Hydroxy Acid) with Pendant Carboxyl Groups, Macromolecules, 1988, 21(11): p. 3338-3340.
Parrish, B., R.B. Breitenkamp and T. Emrick, PEG- and peptide-grafted aliphatic polyesters by click chemistry, of the American Chemical Society, 2005, 127(20): p. 7404-7410.
Rieger, J. et al., Lactone end-capped poly(ethylene oxide) as a new building block for biomaterials, Macromolecules, 2004, 37(26): p. 9738-9745.
Riva, R., et al., Combination of ring-opening polymerization and "click" chemistry towards functionalization of aliphatic polyesters, Chemical Communications, 2005, 2005(42): p. 5334-5336.
Mecerreyes, D., et al., Ring-opening polymerization of 6-hydroxynon-8-enoic acid lactone: Novel biodegradable copolymers containing allyl pendent groups, Journal of Polymer Science Part a-Polymer Chemistry, 2000, 38(5): p. 870-875.
Vogeley, N. J., G.L. Baker and M.R. Smith, III, Synthesis and polymerization of derivatized lactide monomers, Polymer Preprints (American Chemical Society, Division of Polymer Chemistry), 2005, 46(1): p. 336.
Lutz, J.F., 1,3-Dipolar cycloadditions of azides and alkynes: A universal ligation tool in polymer and materials science, Angewandte Chemie-International Edition, 2007, 46(7): p. 1018-1025.
Binder, W.H. and R. Sachsenhofer, 'Click' chemistry in polymer and materials science, Macromolecular Rapid Communications, 2007, 28(1): p. 15-54.

(Continued)

*Primary Examiner* — Gregory Listvoyb
(74) *Attorney, Agent, or Firm* — Harness, Dickey & Pierce, PLC

(57) ABSTRACT

Poly(glycolide) polymers are disclosed. The polymers generally include a polymerized alkynyl-substituted glycolide having a polymer backbone with one or more alkynyl groups appended thereto. The alkynyl groups provide reactive sites for further functionalization of the polymer, for example by reaction with azide derivatives (e.g., azide-substituted organic compounds). Alkynyl and azide groups react via the "click" chemistry mechanism to form functional groups covalently bonded to the polymer via a triazole link. The polymers are biodegradable and can be used to deliver drugs or other therapeutic substances (e.g., large biomolecules such as single strand RNA) at targeted locations in a patient's body and/or at controlled release rates.

20 Claims, 9 Drawing Sheets

(56) References Cited

OTHER PUBLICATIONS

Dirks, A.J.T., et al., Preparation of biohybrid amphiphiles via the copper catalysed Huisgen [3+2] dipolar cycloaddition reaction, Chemical Communications, 2005, 2005(33): p. 4172-4174.

Diaz, D.D., et al., Click chemistry in materials synthesis. 1. Adhesive polymers from copper-catalyzed azide-alkyne cycloaddition, Journal of Polymer Science Part a-Polymer Chemistry, 2004, 42(17): p. 4392-4403.

Joralemon, M.J., et al., Dendrimers clicked together divergently, Macromolecules, 2005, 38(13): p. 5436-5443.

Malkoch, M., et al., Structurally diverse dendritic libraries: A highly efficient functionalization approach using Click chemistry, Macromolecules, 2005, 38(9): p. 3663-3678.

Wu, P., et al., Efficiency and fidelity in a click-chemistry route to triazole dendrimers by the copper(I)-catalyzed ligation of azides and alkynes, Angewandte Chemie-International Edition, 2004, 43(30): p. 3928-3932.

Wu, P., et al., Multivalent, bifunctional dendrimers prepared by click chemistry, Chemical Communications, 2005, 2005(46): p. 5775-5777.

Englert, B.C., S. Bakbak and U.H.F. Bunz, Click chemistry as a powerful tool for the construction of functional poly(p-phenyleneethynylenc)s: Comparison of pre- and postfunctionalization schemes, Macromolecules, 2005, 38(14): p. 5868-5877.

Gao, H., et al., Gradient Polymer Elution Chromatographic Analysis of a,w-Dihydroxypolystyrene Synthesized via ATRP and Click Chemistry, Macromolecules, 2005, 38(22): p. 8979-8982.

Malkoch, M., et al., Orthogonal approaches to the simultaneous and cascade functionalization of macromolecules using click chemistry, Journal of the American Chemical Society, 2005, 127(42): p. 14942-14949.

O'Reilly, R.K., et al., Functionalization of micelles and shell cross-linked nanoparticles using click chemistry, Chemistry of Materials, 2005, 17(24): p. 5976-5988.

Sumerlin, B.S., et al., Highly efficient "click" functionalization of poly(3-azidopropyl methacrylate) prepared by ATRP, Macromolecules, 2005, 38(18): p. 7540-7545.

Riva, R., et al., Combination of ring-opening polymerization and "click chemistry": Toward functionalization and grafting of poly(epsilon-caprolactone), Macromolecules, 2007, 40(4): p. 796-803.

Li, H.Y., et al., Combination of ring-opening polymerization and "click" chemistry for the synthesis of an amphiphilic tadpole-shaped poly(epsilon-caprolactone) grafted by PEO, Macromolecules, 2007, 40(4): p. 824-831.

Rostovtsev, V.V., et al., A stepwise Huisgen cycloaddition process: Copper(1)-catalyzed regioselective "ligation" of azides and terminal alkynes, Angewandte Chemie-International Edition, 2002, 41(14): p. 2596-2599.

Simmons, T.L. and G.L. Baker, Poly(phenyllactide): Synthesis, characterization, and hydrolytic degradation, Biomacromolecules, 2001, 2(3): p. 658-663.

Yin, M. and G.L. Baker, Preparation and characterization of substituted polylactides, Macromolecules, 1999, 32(23): p. 7711-7718.

Vogeley, N.J., G.L. Baker and M.R. Smith, III, Synthesis and polymerization of derivatized lactide monomers, Polymer Preprints (American Chemical Society, Division of Polymer Chemistry), 2005, 46(1): p. 336.

Jiang, X., et al., Synthesis and polymerization of a novel amphiphilic lactide monomer, Polymeric Preprints (American Chemical Society, Division of Polymer Chemistry), 2005, 46(p. 1040).

Schmidt, M., et al., Preparation of some chiral aminodiols from tartaric acid—chiral lithium aluminum-hydride derivatives for asymmetric ketone reductions, Chemische Berichte-Recueil, 1980, 113(5): p. 1691-1707.

O'Neil, E.J., K.M. DiVittorio and B.D. Smith, Phosphatidylcholine-derived bolaamphiphiles via click chemistry, Organic Letters, 2007, 9(2): p. 199-202.

Bohlmann, F., P. Herbst and H. Gleinig, Polyacetylenverbindungen 30. Synthese von naturlich vorkommenden polyacetylenverbindungen mit endstandigen dreifachbindungen, Chemische Berichte-Recueil, 1961, 94(4): p. 948-957.

Hasirci, V., et al., Nanobiomaterials: a review of the existing science and technology, and new approaches, Journal of Biomaterials Science-Polymer Edition, 2006, 17(11): p. 1241-1268.

Kidchob, T., S. Kimura and Y. Imanishi, Thermo-responsive microcapsules using poly(N-isopropylacrylamide), Kobunshi Ronbunshu, 1998, 55(4): p. 192-199.

Skwarczynski, M., Y. Hayashi and Y. Kiso, Paclitaxel prodrugs: Toward smarter delivery of anticancer agents, Journal of Medicinal Chemistry, 2006, 49(25): p. 7253.

Gil, E.S. and S.A. Hudson, Stimuli-reponsive polymers and their bioconjugates, Progress in Polymer Science, 2004, 29(12): p. 1173-1222.

Tsuda, Y., et al., The use of patterned dual thermoresponsive surfaces for the collective recovery as co-cultured cell sheets, Biomaterials, 2005, 26(14): p. 1885-1893.

Yang, J., et al., Cell sheet engineering: Recreating tissues without biodegradable scaffolds, Biomaterials, 2005, 26(33): p. 6415-6422.

Cho, J.H., et al., Chondrogenic differentiation of human mesenchymal stem cells using a thermosensitive poly(N-isopropylacrylamide) and water-soluble chitosan copolymer, Biomaterials, 2004, 25(26): p. 5743-5751.

Gonsalves, K.E., S.H. Jin and M.I. Baraton, Synthesis and surface characterization of functionalized polylactide copolymer microparticles, Biomaterials, 1998, 19(16): p. 1501-1505 45.

Yang, H. and W.Y.J. Kao, Thermoresponsive gelatin/monomethoxy poly(ethylene glycol)-poly(D,L-lactide) hydrogels: Formulation, characterization, and antibacterial drug delivery, Pharmaceutical Research, 2006, 23(1): p. 205-214.

Lutz, J.F. and A. Hoth, Preparation of ideal PEG analogues with a tunable thermosensitivity by controlled radical copolymerization of 2-(2-methoxyethoxy)ethyl methacrylate and oligo(ethylene glycol) methacrylate, Macromolecules, 2006, 39(2): p. 893-896.

Lutz, J.F., O. Akdemir and A. Hoth, Point by point comparison of two thermosensitive polymers exhibiting a similar LCST: Is the age of poly(NIPAM) over?, Journal of the American Chemical Society, 2006, 128(40): p. 13046-13047.

Zhao, B., et al., Synthesis of thermosensitive water-soluble polystyrenics with pendant methoxyoligo(ethylene glycol) groups by nitroxide-mediated radical polymerization, Macromolecules, 2005, 38(23): p. 9509-9317.

Porjazoska, A., et al., Synthesis and aqueous solution properties of functionalized and thermoresponsive poly(D,L-lactide)/polyether block copolymers, Macromolecular Symposia, 2004, 210(p. 427-436.

Han, S., M. Hagiwara and T. Ishizone, Synthesis of thermally sensitive water-soluble polymethacrylates by living anionic polymerizations of oligo(ethylene glycol) methyl ether methacrylates, Macromolecules, 2003, 36(22): p. 8312-8319.

Zhong, Z.Y., et al., Synthesis and aqueous phase behavior of thermoresponsive biodegradable poly(D,L-3-methylglycolide)-block-poly(ethylene glycol)-block-poly(D,L-3-methylglycolide) triblock copolymers, Macromolecular Chemistry and Physics, 2002, 203(12): p. 1797-1803.

Huh, K.M. and Y.H. Bae, Synthesis and characterization of poly(ethylene glycol)/poly(L-lactic acid) alternating multiblock copolymers, Polymer, 1999, 40(22): p. 6147-6155.

Aoshima, S., H. Oda and E. Kobayashi, Synthesis of thermally-induced phase separating polymer with well-defined polymer structure by living cationic polymerization .1. Synthesis of poly(vinyl ether)s with oxyethylene units in the pendant and its phase-separation behavior in aqueous-solution, Journal of Polymer Science Part A-Polymer Chemistry, 1992, 30(11): p. 2407-2413.

Tachibana, Y., et al., Thermo- and pH-responsive biodegradable poly(alpha-N-substituted gamma-glutamine)s, Biomacromolecules, 2003, 4(5): p. 1132-1134.

Shimokuri, T., T. Kaneko and M. Akashi, Specific thermosensitive volume change of biopolymer gels derived from propylated poly(gamma-glutamate)s, Journal of Polymer Science Part A-Polymer Chemistry, 2004, 42(18): p. 4492-4501.

(56) References Cited

OTHER PUBLICATIONS

Watanabe, E. and N. Tomoshige, Preparation and physical properties of thermoresponsive biodegradable poly(asparagine) derivatives, Chemistry Letters, 2005, 34(6): p. 876-877.
Schacht, E., et al., Polyacetal and poly(ortho ester)-poly(ethylene glycol) graft copolymer thermogels: Preparation, hydrolysis and FITC-BSA release studies, Journal of Controlled Release, 2006, 116(2): p. 219-225.
Winzenburg, G., et al., Biodegradable polymers and their potential use in parenteral veterinary drug delivery systems, Advanced Drug Delivery Reviews, 2004, 56(10): p. 1453-1466.
Adams et al., Amphiphilic Block Copolymers for Drug Delivery, J. Pharm. Sci. 92(7):1343-1355 (2003).
Bala et al., PLGA Nanoparticles in Drug Delivery: The State of the Art, 21(5):387-422 (2004).
Becker et al., Diblock Copolymers, Micelles, and Shell-Crosslinked Nanoparticles Containing Poly(4-fluorostyrene): Tools for Detailed Analyses of Nanostructured Materials, J. Polym. Sci. Pol. Chem. 39:4152-4166 (2001).
Bhattarai et al., Novel Polymeric Micelles of Amphiphilic Triblock Copolymer Poly(p-Dioxanone-co-L-Lactide)-block-Poly(ethylene glycol), Pharm. Res. 20(12):2021-2027 (2003).
Blomberg et al., Production of Crosslinked, Hollow Nanoparticles by Surface-Iniated Living Free Radical Polymerization, J. Polym. Sci. Pol. Chem. 40:1309-1320 (2002).
Butun et al., Synthesis of Shell Cross-Linked Micelles with Tunable Hyrophilic/Hydrophobic Cores, J. Am. Chem. Soc. 120:12135-12136 (1998).
Butun et al., Synthesis of Zwitterionic Shell Cross-Linked Micelles, J. Am. Chem. Soc. 121:4288-4289 (1999).
Chapman et al., Hydraamphiphiles: Novel Linear Denritic Block Copolymer Surfactants, J. Am. Chem. Soc. 116:11195-11196 (1994).
Couvreur et al., Nano- and microparticles for the delivery of polypeptides and proteins, Advanced Drug Delivery Reviews 10:141-162 (1993).
Croce et al., Alternative o-Quinodimethane Cross-Linking Precursors for Intramolecular Chain Collapse Nanoparticles, Macromolecules 40:6028-6031 (2007).
Duncan, The Dawning Era of Polymer Therapeutics, Nature Reviews 2:347-360 (2003).
Emoto et al., Coating of Surfaces with Stabilized Reactive Micelles from Poly(ethylene glycol)-Poly(DL-lactic acid) Block Copolymer, Langmuir 15:5212-5218 (1999).
Emoto et al., Functionality of Polymeric Micelle Hydrogels with Organized Three-Dimensional Architecture on Surfaces, J. Am. Chem. Soc. 122:2653-2654 (2000).
Frey et al., Dendritic Polyols Based on Carbosilanes—Lipophilic Dendrimers With Hydrophilic Skin, Macromol. Symp. 102:19-26 (1996).
Gref et al., Biodegradable Long-Circulating Polymeric Nanospheres, Science 263:1600-1603 (1994).
Gref et al., The controlled intravenous delivery of drugs using PEG-coated sterically stabilized nanospheres, Adv. Drug Deliv. Rev. 16:215-233 (1995).
Harth et al., A Facile Approach to Architecturally Defined Nanoparticles via Intramolecular Chain Collapse, J. Am. Chem. Soc. 124:8653-8660 (2002).
Hawker et al., The Convergence of Synthetic Organic and Polymer Chemistries, Science 309:1200-1205 (2005).
Iijima et al., Core-Polymerized Reactive Micelles from Heteroelechelic Amphiphilic Block Copolymers, Macromolecules 32:1140-1146 (1999).
Jiang et al., "Clickable" Polyglycolides: Tunable Synthons for Thermoresponsive, Degradable Polymers, Macromolecules 41:1937-1944 (2008).
Jiang et al., Amphiphilic PEG/Alkyl-Grafted Comb Polylactides, J. Polym. Sci. Pol. Chem. 45:5227-5236 (2007).
Jiang et al., Water-Soluble Thermoresponsive Polylactides, Macromolecules 41:318-324 (2008).

Jin et al., Nanoparticle-Mediated Drug Delivery and Gene Therapy, Biotechnol. Prog. 23:32-41 (2007).
Jing et al., Cyclohexyl-Substituted Polyglycolides with High Glass Transition Temperatures, Macromolecules 40:9304-9312 (2007).
Joralemon et al., Shell Click-Crosslinked (SCC) Nanoparticles: A New Methodology for Synthesis and Orthogonal Functionalization, J. Am. Chem. Soc. 127:16892-16899 (2005).
Kakizawa et al., Block copolymer micelles for delivery of gene and related compounds, Adv. Drug Deliv. Rev. 54:203-222 (2002).
Kataoka et al., Block copolymer micelles for drug delivery: design, characterization and biological significance, Adv. Drug Deliv. Rev. 47:113-131 (2001).
Kim et al., Core-stabilized Polymeric Micelle as Potential Drug Carrier: Increased Solubilization of Taxol, Polym. Adv. Technol. 10:647-654 (1999).
Lawrence, Surfactant Systems: Their Use in Drug Delivery, Chem. Soc. Rev. 23:417-424 (1994).
Liu et al., Nanomedicine for drug delivery and imaging: A promising avenue for cancer therapy and diagnosis using targeted functional nanoparticles, Int. J. Cancer 120:2527-2537 (2007).
Liu et al., Synthesis and Characterization of Biodegradable "Polystyrene" by Ring Opening Polymerization, Polymeric Materials: Science & Engineering 88:420-421 (2003).
Liu et al., Synthesis of Polymandelide: A Degradable Polyactide Derivative with Polystyrene-like Properties, Macromolecules 40:6040-6047 (2007).
Liu et al., Unimolecular Micelles: Synthesis and Characterization of Amphiphilic Polymer Systems, J. Polym. Sci. Pol. Chem. 37:703-711 (1999).
Lutz et al., Combining Atom Transfer Radical Polymerization and Click Chemistry: A Versatile Method for the Preparation of End-Functional Polymers, Macromol. Rapid Commun. 26:514-518 (2005).
Newkome et al., Alkane Cascade Polymers Possessing Micellar Topology: Micellanoic Acid Derivatives, Angew. Chem. Int. Ed. Engl. 30(9):1176-1178 (1991).
Newkome et al., Unimolecular Micelles, Angew. Chem. Int. Ed. Engl. 30(9):1178-1180 (1991).
Opsteen et al., Modular synthesis of block copolymers via cycloaddition of terminal azide and alkyne functionalized polymers, Chem. Commun. 57-59 (2005).
Parrish et al., Soluble Camptothecin Derivatives Prepared by Click Cycloaddition Chemistry on Functional Aliphatic Polyesters, Bioconjugate Chem. 18:263-267 (2007).
Portis et al., Confocal Microscopy for the Analysis of siRNA Delivery by Polymeric Nanoparticles, Microscopy Research and Technique 73:878-885 (2010).
Schartl, Crosslinked Spherical Nanoparticles with Core-Shell Topology, Adv. Mater. 12(24):1899-1908 (2000).
Service, Nanoparticle Trojan Horses Gallop From the Lab Into the Clinic, Science 330:314-315 (2010).
Simmons et al., Poly(phenyllactide): Synthesis, Characterization, and Hydrolytic Degradation, Biomacromolecules 2:658-663 (2001).
Sivakumar et al., A Fluorogenic 1,3-Dipolar Cycloaddition Reaction of 3-Azidocoumarins and Acetylenes, 6(24):4603-4606 (2004).
Tomalia et al., Starburst Dendrimers. 4. Covalently Fixed Unimolecular Assemblages Reminiscent of Spheroidal Micelles, Macromolecules 20:1164-1167 (1987).
Uhrich et al., Polymeric Systems for Controlled Drug Release, Chem. Rev. 99:3181-3198 (1999).
van Hest et al., Polystyrene-Dendrimer Amphiphilic Block Copolymers with a Generation-Dependent Aggregation, Science 268:1592-1595 (1995).
van Hest et al., Polystyrene-Poly(propylene imine) Dendrimers: Synthesis, Characterization, and Association Behavior of a New Class of Amphiphiles, Chem. Eur. J. 2(12):1616-1626 (1996).
Wooley, Shell Crosslinked Polymer Assemblies: Nanoscale Constructs Inspired from Biological Systems, J. Polym. Sci. Pol. Chem. 38:1397-1407 (2000).
Yin et al., Preparationa and Characterization of Substituted Polylactides, Macromolecules 32(23):7711-7718 (1999).

* cited by examiner

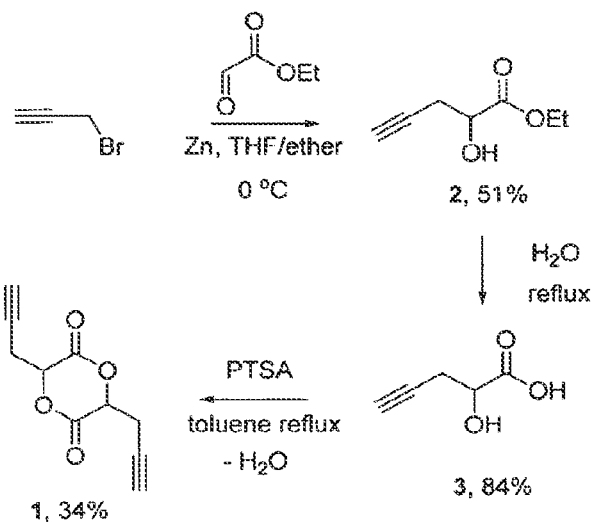
Figure 8A (Scheme 1)
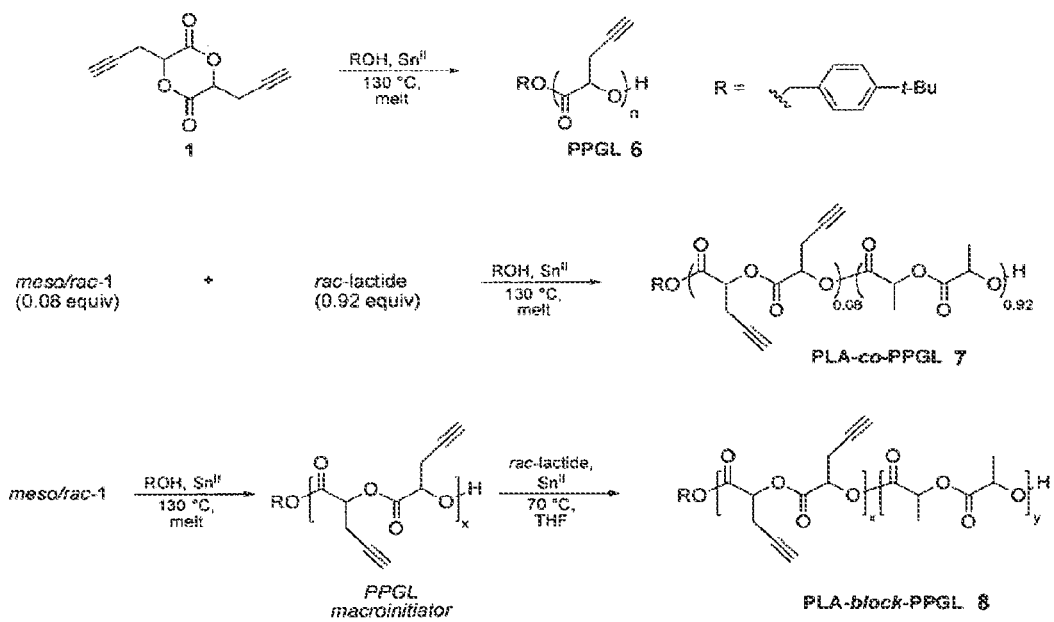
Figure 8B (Scheme 2)

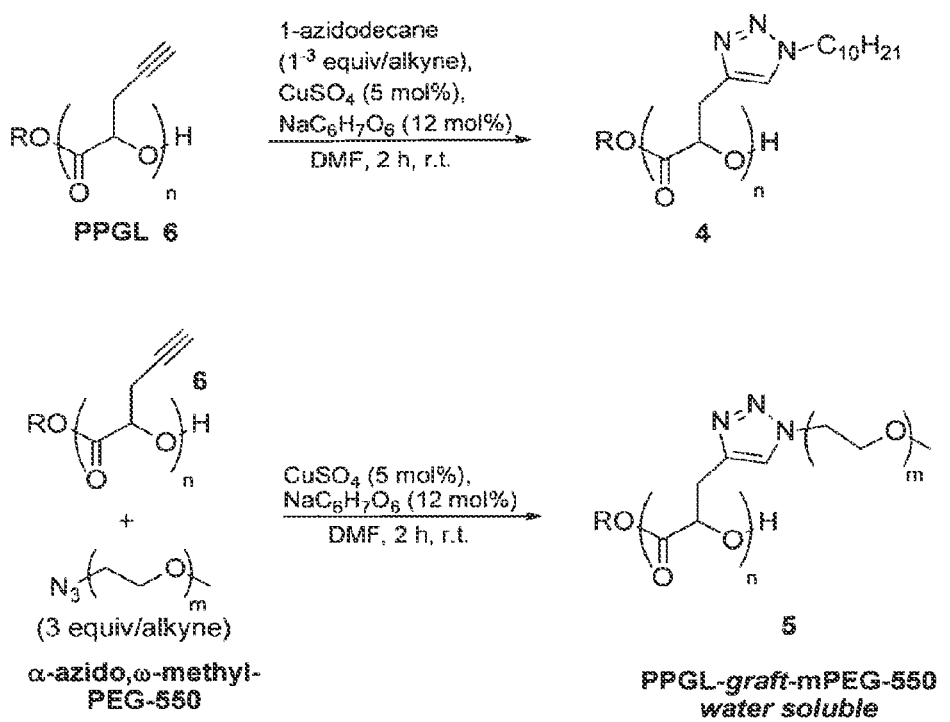
Figure 8C (Scheme 3)
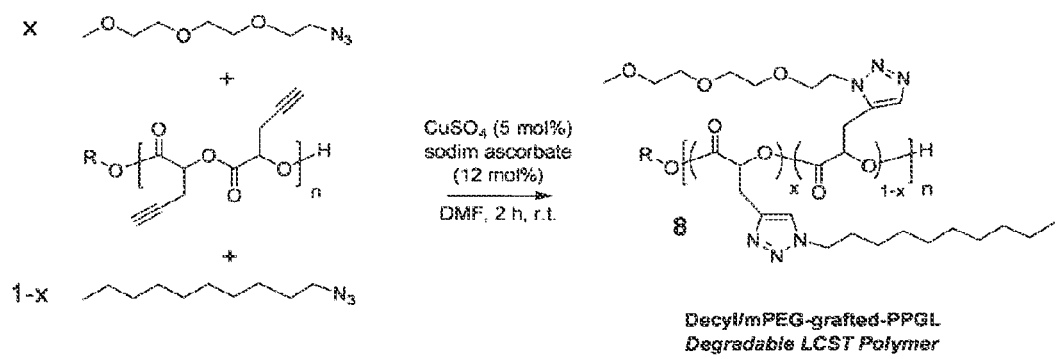
Figure 8D (Scheme 4)

FUNCTIONALIZATION OF POLYGLYCOLIDES BY "CLICK" CHEMISTRY

CROSS-REFERENCE TO RELATED APPLICATIONS

Priority to U.S. Provisional Application Ser. No. 60/966,042, filed Aug. 24, 2007, which is incorporated herein by reference in its entirety, is claimed.

Priority to U.S. Provisional Application Ser. No. 61/135,679, filed Jul. 23, 2008, which is incorporated herein by reference in its entirety, also is claimed.

BACKGROUND OF THE DISCLOSURE

1. Field of the Disclosure

The present disclosure relates to alkynyl-substituted glycolides and in particular, the acetylene-functionalized glycolide monomer, 3,6-dipropargyl-1,4-dioxane-2,5-dione (1). The subsequent polymerization of the glycolide 1 provides a poly(glycolide) polymer as a homopolymer of glycolide 1 as well as random and block copolymers with lactide. The poly (glycolide) polymers have pendant alkynyl groups available for the attachment of functional groups (e.g., azide-substituted organic compounds) using "click" chemistry to form a covalent triazole link between the poly(glycolide) polymer backbone and the desired functional group.

2. Brief Description of Related Technology

The biodegradability and biocompatibility of aliphatic polyesters have established polymers derived from lactide, glycolide and ε-caprolactone as key materials for biomedical applications. However, the parent homopolymers have limitations. For example, they are often too hydrophobic for applications in aqueous environments, and more importantly, they lack chemical functionality that enables modification of the polymer backbone. Recent work describes successful strategies for appending hydroxyl[1-3], carboxyl[4], poly(ethylene oxide) (PEO)[1,5-7], allyl[8-9], and acetylene[5] functionalities to polyesters by co-polymerization with functional monomers, post-polymerization modification of polymers, or a combination of these two approaches.

The functional monomer approach involves multi-step synthetic procedures each time modification is desired. Moreover, the functionality that is introduced must be compatible with polymerization conditions. Similarly, post-polymerization modification requires careful control of reaction conditions to avoid backbone degradation.

Because of its high selectivity, reliability, and tolerance to broad range of functional groups and reaction conditions, "click" chemistry, specifically the copper(I)-mediated 1,3-dipolar cycloaddition of azides and alkynes, is a powerful strategy for elaborating polymer architectures.[10-11] "Click" chemistry has been used for the preparation of block copolymers[12,13], cross-linked adhesives[14], dendrimers[15-18], and the introduction of pendant and terminal functional groups into various polymers including polyesters.[5,7,19-26]

The Emrick group first described the use of aqueous "click" chemistry to graft azide-terminated PEO and peptides onto polyesters containing pendant acetylene groups.[5] Later, Jerôme and coworkers found Emrick's conditions caused significant backbone degradation during functionalization.[7] Using less severe conditions (THF as the solvent), they were able to introduce PEO, tertiary amines and ammonium salts onto caprolactone-based polyesters having pendant azides. Unfortunately, lactide copolymers are more hydrolytically sensitive than caprolactones, requiring capping of the polymer hydroxyl groups to avoid significant backbone degradation under Jerôme's conditions. In addition, "click" reactions using CuI, the catalyst used by Jerôme, are subject to more side reactions than Cu(I) catalysts generated in situ.[27]

The properties of polyglycolides have been tailored through the synthesis and polymerization of substituted glycolides. Successfully prepared substituted glycolides include poly(phenyllactide)[28], polymandelide[29], alkyl-substituted polyglycolides[30], allyl-substituted polyglycolide[31], PEO-substituted polyglycolides, and alkyl/PEO-substituted amphiphilic polyglycolides.[32] Baker et al. U.S. Pat. No. 6,469,133 relates to polymers of cyclic esters, and is incorporated herein by reference in its entirety.

Objects

Therefore it is an object of the disclosure to provide novel glycolide polymers using an improved method of "click" chemistry using azides and aliphatic groups with alkyne unsaturation. It is further an object to provide a process for producing alkynyl-substituted glycolides (glycolides) which is easy to perform and economical with high yields. These and other objects will become increasingly apparent by reference to the following description and the drawings.

In contrast to the functional monomer approach, post-polymerization modification offers the distinct advantage that an array of polymers can in principle be accessed from a single monomer. Having a single, simple procedure for placing a broad spectrum of pendant functional groups onto polyester substrates is highly desirable. Consequently, it is essential that the specific approach taken utilizes a chemical process that (i) does not degrade the polyester backbone and (ii) is compatible with a wide range of functional groups, solvents, and conditions. Further, it would be useful to have a simpler and more reliable protocol for "click" functionalization of polyesters, and especially polyesters based on glycolide/lactide monomers.

SUMMARY

Stimulated by the versatility of "click" chemistry for post-polymerization modification of polyesters, as well as the importance of lactide-based functional polymers in materials and medical applications, we synthesized 3,6-dipropargyl-1,4-dioxane-2,5-dione 1, an alkynyl-substituted glycolide monomer. Subsequent polymerization of the glycolide monomer 1 and copolymerizations with lactide provide new polyglycolide homopolymers and copolymers (both random and block) that have pendant alkynyl groups available for the attachment of chemical functionality using "click" chemistry. Also, a new click-functionalization protocol has been devised to overcome limitations encountered when click functionalizations of polyglycolides were attempted using Emrick's or Jerôme's conditions. The new protocol permits click functionalization of polyglycolides with substantially no degradation in molecular weight. The drawbacks encountered in Emrick's and Jerôme's conditions for click functionalization of polyesters were overcome by carrying out the reaction in DMF at room temperature in the presence of copper (II) sulfate and sodium ascorbate. The effectiveness of this protocol was demonstrated by the preparation of alkyl- and PEO-grafted polyglycolides. As a further demonstration, a family of degradable thermoresponsive materials that exhibit lower critical solution temperatures (LCST) over a broad and physiologically relevant temperature range has been prepared.

The disclosure generally relates to a poly(glycolide) polymer comprising a polymerized alkynyl-substituted glycolide.

The alkynyl-substituted glycolide comprises an alkynyl group, and is preferably mono- or di-alkynyl substituted (e.g., dipropargyl glycolide). Each alkynyl group preferably contains 3 to 12 carbon atoms (e.g., a propargyl group with a terminal alkynyl group). The poly(glycolide) polymer can be functionalized with an azide-derived group.

In a first embodiment, the polymerized alkynyl-substituted glycolide of the poly(glycolide) polymer comprises one or more repeating units according to Formula I

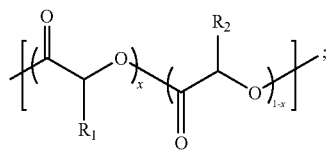

[Formula I]

wherein: (i) $R_1$ comprises one or more moieties selected from a hydrogen, an alkyl group, an aryl group, and the alkynyl group; (ii) $R_2$ comprises the alkynyl group; and, (iii) x is between 0 and 1. In a refinement of the first embodiment, the poly(glycolide) polymer can further include other, non-alkynyl-containing polyester repeating units (e.g., lactide units), thereby forming a random copolymer or a block copolymer.

In a second embodiment, the polymerized alkynyl-substituted glycolide of the poly(glycolide) polymer comprises one or more polymeric chains according to Formula II

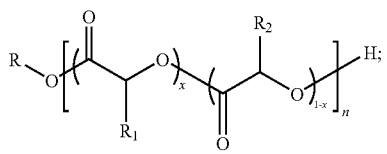

[Formula II]

wherein: (i) $R_1$ comprises one or more moieties selected from a hydrogen, an alkyl group, an aryl group, and the alkynyl group; (ii) $R_2$ comprises the alkynyl group; (iii) R comprises a terminal group; (iv) x ranges from 0 to less than 1; and, (v) n ranges from about 10 to about 1000.

In a third embodiment, the alkynyl-substituted glycolide that is polymerized to form the poly(glycolide) polymer comprises one or more monomers according to Formula III

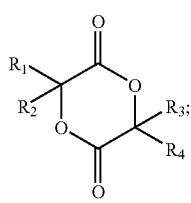

[Formula III]

wherein: (i) $R_1$, $R_2$, $R_3$, and $R_4$ are independently selected from a hydrogen, an alkyl group, an aryl group, and the alkynyl group; and (ii) at least one of $R_1$, $R_2$, $R_3$, and $R_4$ is the alkynyl group. Preferably, the glycolide is di-alkynyl-substituted, for example including the propargyl glycolide of Formula IIIa:

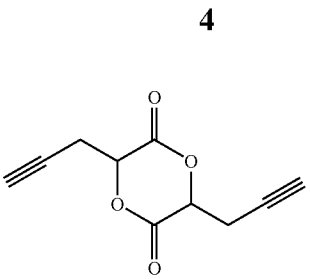

[Formula IIIa]

Any of the foregoing embodiments of the poly(glycolide) polymer can be functionalized to include a triazole reaction product of (a) the poly(glycolide) polymer pendant alkynyl groups and (b) an azide-substituted organic compound. Preferably, the azide-substituted organic compound includes one or more of an azide-substituted polyoxyalkylene, an azide-substituted organic amine, an azide-substituted organic ammonium salt, an azide-substituted organic imine, an azide-substituted organic amide, an azide-substituted carboxylic acid, an azide-substituted carboxylate salt, an azide-substituted ester, an azide-substituted alkyl polyoxyalkylene, an azide-substituted alcohol, an azide-substituted alkane, an azide-substituted alkene, a diazido alkane. In a refinement, (i) the azide-substituted organic compound comprises an azide-substituted alkane and an azide-substituted polyoxyalkylene; and (ii) the functionalized poly(glycolide) polymer has a lower critical solution temperature (LCST) ranging from about 25° C. to about 65° C. (or about 35° C. to about 40° C.) and an LCST transition range of about 5° C. or less.

The disclosure also provides a process for preparing a functionalized polyester polymer, the process comprising: (a) providing a polyester polymer or copolymer comprising backbone-pendant alkynyl groups; and (b) forming a functionalized polyester polymer by reacting an azide-substituted organic compound with the polyester polymer in the presence of a copper salt and a reducing agent in a non-reactive solvent at about room temperature, thereby (i) generating Cu(I) in situ and (ii) covalently grafting the organic compound to the polyester polymer via a triazole reaction product of the alkynyl group and the azide-substituted organic compound. The polyester polymer preferably includes a poly(glycolide) polymer comprising: a polymerized alkynyl-substituted glycolide, the alkynyl-substituted glycolide comprising an alkynyl group containing 3 to 12 carbon atoms. Preferably, the functionalized polyester polymer has a degree of polymerization that is substantially the same as that of the polyester polymer. The polyester polymer that is functionalized in step (b) can include one or more terminal hydroxyl groups. Preferably, the copper salt comprises copper (II) sulfate, the reducing agent comprises sodium ascorbate, the non-reactive solvent comprises dimethyl formamide (DMF), and the temperature ranges from about 0° C. to about 50° C. When the polyester polymer is a poly(glycolide) polymer, the poly(glycolide) polymer can be formed by reacting an alkynyl-substituted glycolide in the presence of an initiator (e.g., t-butylbenzyl alcohol) and a metal catalyst (e.g., Sn(2-ethylhexanoate)$_2$) at a polymerization temperature ranging from about 30° C. to about 180° C. (e.g., about 110° C. to about 150° C., or about 130° C.), thereby forming the poly(glycolide) polymer. Further, a monoalkynyl glycolide can be polymerized to form a regioregular AB polymer.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein:

FIGS. 8A to 8C are reaction schemes illustrating the synthesis of an alkynyl glycolide (Scheme 1; FIG. 8A), poly(glycolide) polymers (Scheme 2; FIG. 8B; including homopolymers, random copolymers, and block copolymers), functionalized poly(glycolide) polymers (Scheme 3; FIG. 8C; including alkyl-grafted and PEG-grafted polymers), and co-functionalized poly(glycolide) polymers (Scheme 4; FIG. 8D; including both alkyl- and PEG-grafted functional groups).

DETAILED DESCRIPTION

Figure 1:
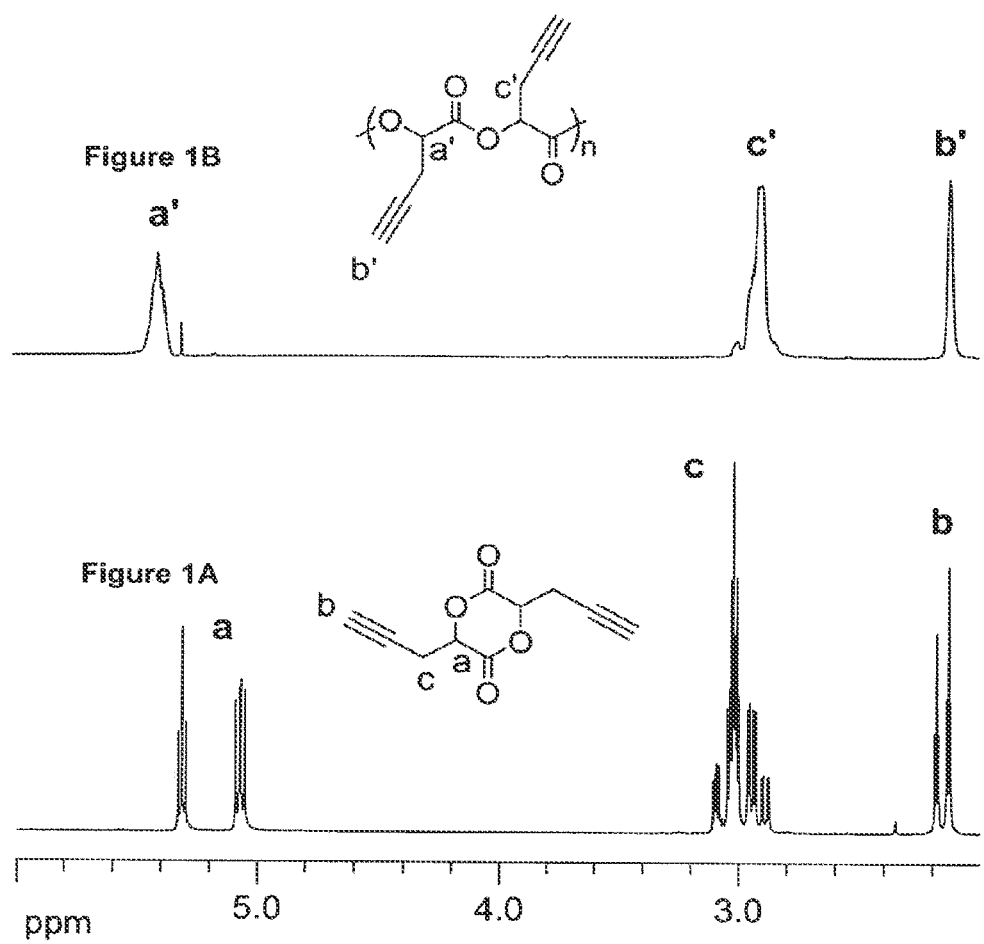
FIGS. 1A and 1B are 300 MHz $^1$H NMR spectra of propargyl glycolide 1 (FIG. 1A) and a poly(propargyl glycolide) homopolymer 6 (PPGL) (1B).

Poly(glycolide) polymers are disclosed. The polymers generally include a polymerized alkynyl-substituted glycolide having a polymer backbone with one or more alkynyl groups appended thereto. The alkynyl groups provide reactive sites for further functionalization of the polymer, for example by reaction with azide derivatives (e.g., azide-substituted organic compounds). Alkynyl and azide groups react via the "click" chemistry mechanism to form functional groups covalently bonded to the polymer via a triazole link. The polymers are biodegradable and can be used to deliver drugs or other therapeutic substances (e.g., large biomolecules such as single strand RNA) at targeted locations in a patient's body and/or at controlled release rates.

Poly(Glycolide) Polymers

The poly(glycolide) polymers according to the disclosure can generally be described in various forms: (I) in terms of repeating units contained in the polymer, (2) in terms of the polymeric chain itself, and/or (3) as the polymerized reaction product of its precursors.

As used herein, the term "glycolide" refers to the reaction product when two mono-basic hydroxy acids form a cyclic diester containing four (4) carbon atoms in the ring. The basic ring structure is a dioxandione (i.e., the condensation product of two glycolic acid (2-hydroxyethanoic acid) molecules). The glycolide monomer according to the disclosure has an alkynyl group substituted on at least one (e.g., on one or two) of the carbon atoms in the ring structure. A poly(glycolide) polymer (or polyglycolide) includes a polymer resulting from the ring-opening polymerization of the alkynyl-substituted glycolide monomer. The alkynyl-substituted glycolide for producing heteropolymers can have various substituents (e.g., aliphatic (alkyl, alkenyl, etc.), aromatic (aryl, etc.)) on the carbon atoms along with the alkynyl groups. A "lactide" is a type glycolide and refers to the cyclic diester condensation product of two 3-carbon α-hydroxy acids, particularly when the α-hydroxy acid is lactic acid (2-hydroxypropanoic acid). A poly(lactide) polymer (or polylactide) includes a polymer of a lactide.

The polymer backbone includes one or more pendant alkynyl groups. Such groups are generally hydrocarbons having at least one (e.g., only one) alkynyl functionality (—C≡C—) that serves as a reactive site for the 1,3-dipolar cycloaddition of a functionalized azide to the polymer backbone, resulting in a triazole group linking the azide-functional group to the polymer backbone (described below). The alkynyl groups preferably have 2 to 20 carbons, for example 3 to 12 carbons or 3 to 6 carbons. Preferably, the alkynyl groups are linear and the alkynyl functionality is located at the terminal position in the hydrocarbon chain (i.e., at the furthest position away from the polymer backbone). For example, a suitable alkynyl group includes the 1-propynyl (or propargyl) group bonded to the polymer backbone at the 3-carbon position of the 1-propynyl group (e.g., as illustrated in structure 6 of FIG. 8B).

In a first embodiment, the poly(glycolide) polymer includes one or more repeating units according to Formula I:

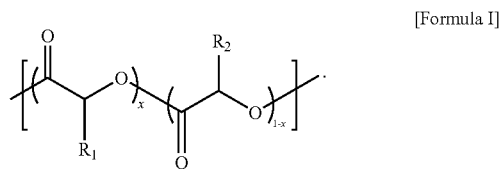

[Formula I]

In Formula I: (i) $R_1$ includes one or more moieties selected from a hydrogen, a non-alkynyl organic group, and the alkynyl group, (ii) $R_2$ is the alkynyl group; and, (iii) x is between 0 and 1. When x is 1 and $R_1$ is uniformly hydrogen, Formula I simply represents an unmodified poly(glycolide). The polymers according to the disclosure, however, contain at least some alkynyl groups (and/or some post-polymerization triazole functionalization of the same); accordingly, x is less than one (e.g., x is between 0 and 1).

In a second embodiment, the poly(glycolide) polymer includes one or more polymeric chains according to Formula II:

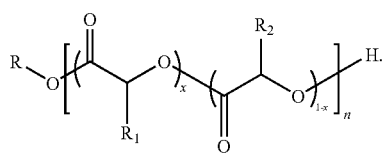

[Formula II]

In Formula II: (i) $R_1$ includes one or more moieties selected from a hydrogen, a non-alkynyl organic group, and the alkynyl group; (ii) $R_2$ is the alkynyl group; and (iii) R is a terminal group (e.g., a hydrogen, an alkyl group, for example a $C_1$-$C_{10}$ alkyl group, a polyxyalkylene). In this embodiment, x ranges from 0 to less than 1, thereby requiring at least some alkynyl groups via the $R_2$ moiety. A wide variety of degrees of polymerization are acceptable, and n suitably ranges from about 10 to about 1000 (preferably about 20 to about 400, or about 30 to about 300).

In a third embodiment, the poly(glycolide) polymer includes a polymerized reaction product of its corresponding monomers. The monomers include one or more alkynyl-substituted glycolides according to Formula III

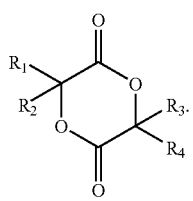

[Formula III]

In Formula III: (i) $R_1$, $R_2$, $R_3$, and $R_4$ are independently selected from a hydrogen, a non-alkynyl organic group, and the alkynyl group; and (ii) at least one (e.g., one or two) of $R_1$, $R_2$, $R_3$, and $R_4$ is the alkynyl group. Preferably, the glycolide of Formula III includes two alkynyl groups: one at $R_1$ or $R_2$ and one at $R_3$ or $R_4$. A suitable di-alkynyl glycolide is the propargyl glycolide represented by Formula IIIa

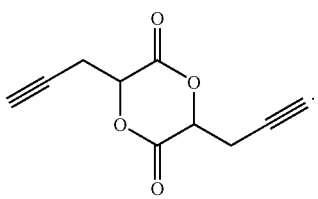

[Formula IIIa]

Glycolides formed from the condensation of a racemic mixture of alkynyl-substituted glycolic acid generally contain both meso- and rac-diastereomers (e.g., in a ratio of about 1:1). Thus, when the glycolide of Formula III has two alkynyl groups, the glycolide generally includes a mixture of the two diastereomers (e.g., some molecules in which $R_1$ and $R_3$ are the alkynyl groups, and some molecules in which $R_1$ and $R_4$ are alkynyl groups).

The groups $R_1$ to $R_4$ in the forgoing structures, when not representing an alkynyl group, can include hydrogen or other organic groups. The organic group is not particularly limited, generally including aliphatic hydrocarbon groups (linear or branched, including alkyl or alkenyl) and/or aromatic (aryl) hydrocarbon groups. Such hydrocarbon groups can have from 0 to 20 carbon atoms (where "0" represents a limiting case in which the hydrocarbon group is a hydrogen atom), for example 1 to 18 carbon atoms, 1 to 12 carbon atoms, or 1 to 6 carbon atoms. In some embodiments, the groups $R_1$ to $R_4$ include alkyl groups. The alkyl groups provide a hydrophobic character to the polymer and allow the tailoring of polymer properties (e.g., adjust the molecular weight, adjust the hydrophilic/hydrophobic balance, induce the formation of inverse micelles). The alkyl groups are appended directly to the polymer backbone (i.e., absent a triazole linkage). In this embodiment, the alkyl group is preferably integrated into the polymer by appending the alkyl group to a glycolide monomer. For example, a di-alkyl-substituted glycolide (e.g., lactide, where the alkyl group is —$CH_3$) can be copolymerized with a di-alkynyl-substituted glycolide (e.g., structure 1 of FIG. 8A). Alternatively or additionally, an alkyl-substituted derivative of glycolic acid (e.g., lactic acid, where the alkyl group is —$CH_3$) can be condensed with an alkynyl-substituted derivative of glycolic acid (e.g., structure 3 of FIG. 8A), thereby forming a blend of a di-alkyl-substituted glycolide (e.g., lactide), a di-alkynyl-substituted glycolide (e.g., structure 1 of FIG. 8A), and an alkyl-alkynyl-substituted glycolide (e.g., 3-(2-propynyl)-6-methyl-1,4-dioxane-2,5-dione). The resulting blend of glycolide derivatives can then be copolymerized to form a polymer having a desired distribution of alkyl and alkynyl functionalities.

In some embodiments, the poly(glycolide) polymer can be a copolymer, for example a copolymer incorporating other biodegradable repeating units. The inclusion of a comonomer can be used to alter the density of functional groups (i.e., alkynyl groups and/or triazole derivatives thereof) along the polymer backbone while retaining the biodegradable character of the polymer as a whole. A preferred copolymer includes a poly(glycolide-lactide) copolymer that further includes lactide repeating units with glycolide repeating units along the polymer backbone (e.g., as described above for embodiments in which $R_1$ and/or $R_2$ include alkyl groups). Other suitable copolymer repeating units include polyester units having from 2 to 10 carbon atoms in the repeating unit along the length of the polymer backbone (e.g., including the repeating unit derived from copolymerization with ε-caprolactone). In such a case, the copolymer can be a block copolymer (e.g., when the poly(glycolide) polymer is further reacted with a lactide or other monomer) or a random copolymer (e.g., when a glycolide monomer such as propargyl glycolide is copolymerized with a lactide or other monomer).

In the foregoing embodiments, the poly(glycolide) polymer generally includes a variety of groups along its backbone, for example hydrogens, non-alkynyl organic groups, and alkynyl groups. The various groups can be included in the polymer in various proportions according to desired properties of the final polymer. The polymer backbone requires at least some alkynyl groups to facilitate subsequent polymer functionalization via triazole formation. Thus, while some of the backbone groups can include non-functional hydrogens or other organic groups, the alkynyl-substituted glycolide precursor (e.g., as represented by Formula IIIa) preferably contains two alkynyl groups such that the repeating unit in Formula I is saturated with alkynyl groups (i.e., all or substantially all of the $R_1$ and $R_2$ in Formula I are alkynyl groups).

Functionalized Poly(Glycolide) Polymers

The poly(glycolide) polymer can be functionalized to impart desired features to the basic polymer. The functionalized poly(glycolide) polymer generally includes the triazole reaction product of the poly(glycolide) polymer and an azide-substituted organic compound. In this case, the groups $R_1$ and $R_2$ in Formulas I and II above can additionally represent the triazole reaction product of the $R_1$ and $R_2$ alkynyl groups in the original poly(glycolide) polymer and the azide-substituted organic compound, for example as illustrated in structures 4, 5, and 8 of FIGS. 8C and 8D for cases where the azide-substituted organic compounds are azide-substituted alkanes and azide-substituted polyoxyethylenes.

Figure 9:
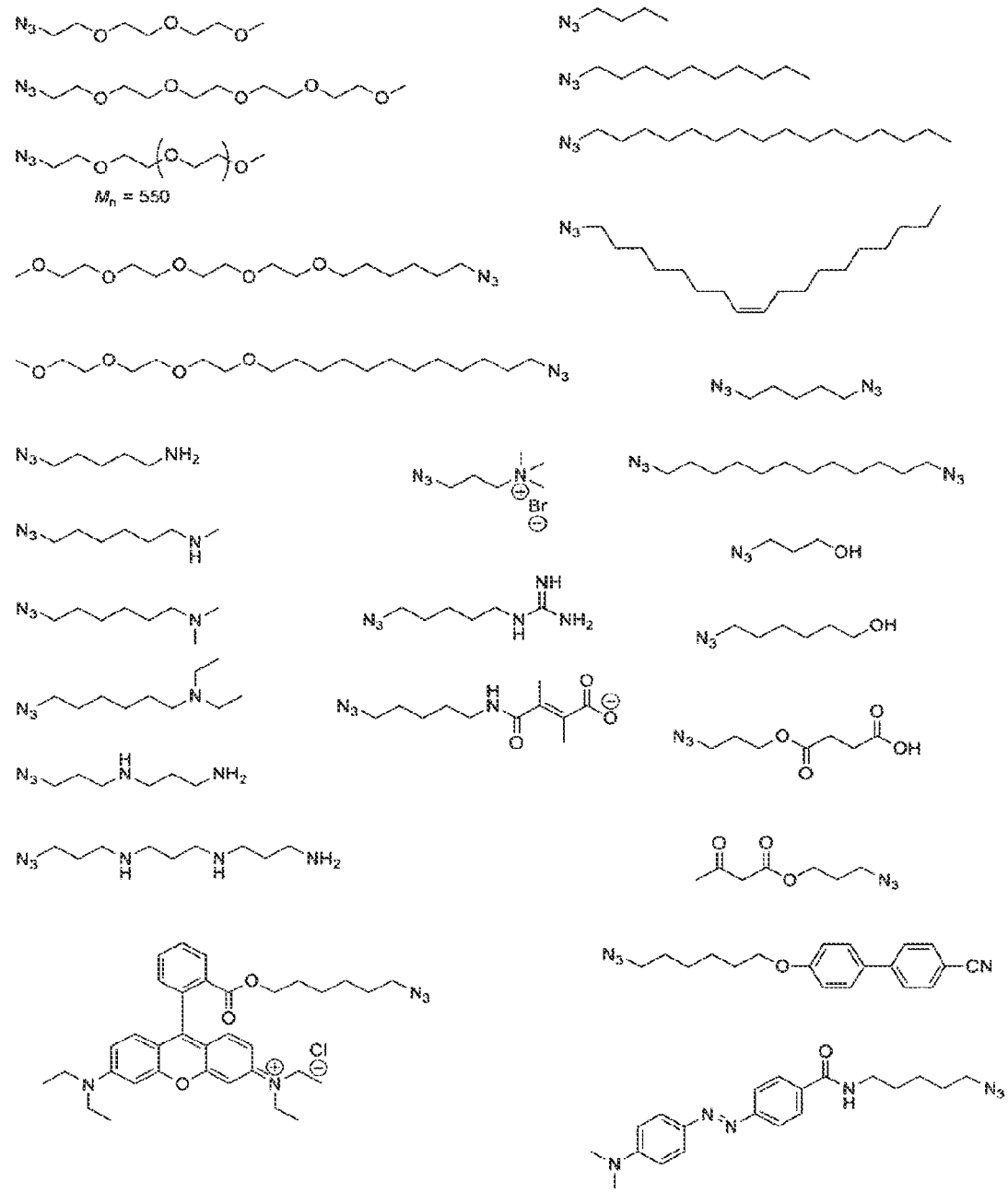
FIG. 9 illustrates representative chemical structures of azide-substituted organic compounds capable of click-functionalization on the poly(glycolide) polymer.

The azide-substituted organic compounds are not particularly limited, generally including hydrophilic organic azido groups, hydrophobic organic azido groups (also including amphiphilic organic azido groups), di-azido organic crosslinking groups, and azide-substituted drug derivatives, for example including the variety of representative structures illustrated in FIG. 9. Examples of suitable azide-substituted organic compounds include azide-substituted polyoxyalkylenes, azide-substituted organic amines (and ammonium salts thereof), azide-substituted organic amides, azide-substituted organic imines, an azide-substituted carboxylic acid, azide-substituted carbonyl-containing compounds (e.g., ketones, carboxylic acids, carboxylate salts, esters), azide-substituted alkyl polyoxyalkylenes, azide-substituted alcohols, azide-substituted alkanes, azide-substituted alkenes, diazido alkanes, and azide-substituted dyes. In some embodiments, the azide-substituted organic compound can include more than of the foregoing functional groups, for example as illustrated in FIG. 9 (e.g., the 3-azidopropyl ester of butanedioic acid illustrated containing both ester and carboxylic acids functionalities).

The groups $R_1$ and $R_2$ in Formulas I and II can generally include hydrophilic organic triazole groups resulting from the click functionalization of azide-substituted hydrophilic organic groups. As used herein, the term "hydrophilic" as applied to organic triazole groups can include organic groups (or their organic azide precursors) that contain substantially exclusively hydrophilic units. Examples of suitable hydrophilic units include alkoxy groups (e.g., methoxy, ethoxy (preferable), propoxy, higher alkoxy), organic amino groups (e.g., primary, secondary, and tertiary amines, also including ammonium salts thereof, for example halogen salts), carbonyl groups (e.g., ketones), carboxylic groups (e.g., in acid and/or salt form, including alkali metal salts), hydroxyl groups, and esters. The term "hydrophilic" additionally can include amphiphilic organic triazole groups (and precursors) that contain both hydrophilic units and hydrophobic units. Thus, an azide-substituted polyoxyethylene of the form $N_3[C_2H_4O]_nR$ would generally be characterized as substantially exclusively hydrophilic when R is a hydrogen or a methyl group, based on the hydrophilic nature of the ethoxy $-C_2H_4O-$ unit; as the number of carbons in R increases, however, the azide-substituted polyoxyethylene assumes more hydrophobic character, but would still be sufficiently hydrophilic (i.e., amphiphilic) to promote the compatibility of the functionalized poly(glycolide) polymer in an aqueous environment.

The azide-substituted hydrophilic organic groups generally have an aliphatic hydrocarbon base structure (e.g., linear alkyl) with the hydrophilic unit(s) located at one or more positions along the length of the hydrocarbon base structure. The hydrocarbon base structure can be of variable size depending of the desired properties of the functionalized polymer; common sizes generally range from 1 to 50 carbon atoms, for example from 2 to 30 carbon atoms, 2 to 20 carbon atoms, or 3 to 12 carbon atoms. Examples of suitable hydrophilic (or amphiphilic) azide-substituted triazole precursors include azide-substituted polyoxyalkylenes (e.g., 4 to 50 carbon atoms or 6 to 20 carbon atoms, including the polyoxyethylenes described above); azide-substituted organic amines and ammonium salts thereof (e.g., 1 to 20 carbon atoms (or 2 to 10 carbon atoms) and having at least one amino/ammonium group); azide-substituted carboxylic acid/salts (e.g., 1 to 20 carbon atoms (or 2 to 10 carbon atoms) and having at least one (preferably terminal) carboxylic group); azide-substituted alcohols, ketones, ethers, esters, imines, and amides (e.g., 1 to 20 carbon atoms (or 2 to 10 carbon atoms). Other, generally amphiphilic suitable azide-substituted triazole precursors can include azide-substituted alkyl groups (e.g., 1 to 20 carbon atoms or 2 to 10 carbon atoms) terminated with polyoxyalkylenes (e.g., 4 to 50 carbon atoms or 6 to 20 carbon atoms). For example, such an amphiphilic triazole precursor can be of the form $N_3R_a[C_2H_4O]_nR$, where n and R are as before, and Ra is an alkyl group (e.g., a $C_1$-$C_{20}$ alkyl group or a $C_2$-$C_{10}$ alkyl group).

The hydrophilic organic triazole groups preferably include reaction products of a polymer backbone-pendant alkynyl group and an azide-substituted polyoxyethylene. For example, suitable azide-substituted polyoxyethylenes can generally be polyethylene glycols of the form $N_3[C_2H_4O]_nR$, where n preferably ranges from 2 to 20 (e.g., 3 to 15 or 3 to 8) and R is a terminal group (e.g., a hydrogen, an alkyl group, for example a $C_1$-$C_{10}$ alkyl group). Equivalently, the resulting hydrophilic organic triazole group can be represented by -Tr$[C_2H_4O]_nR$, where n and R are as before, and Tr is a 1,4-disubstituted 1,2,3-triazole (i.e., linked to the polyoxyethylene at the 1-position of the triazole and linked to the polymer backbone via the 4-position of the triazole). Preferred azide-substituted polyoxyethylenes include PEG-550 monomethyl ether ("mPEG"), 10-axido-2,5,8-trioxadecane ("mDEG", where n is 3 and R is methyl in the foregoing generic azide derivative), and azidoethyl tetraethylene glycol methyl ether (i.e., n is 5 and R is methyl). The azide-substituted polyoxyethylene can be formed by methods generally known in the art, for example by tosylating a polyoxyethylene (e.g., PEG-550 monomethyl ether or the aforementioned pentaethylene glycol methyl ether) and reacting the same with an azide salt (e.g., sodium azide).

The groups $R_1$ and $R_2$ in Formulas I and II can generally include hydrophobic organic triazole groups resulting from the click functionalization of azide-substituted hydrophobic organic groups. The hydrophobic organic triazole groups can be included in the polymer, for example, to adjust the molecular weight of the polymer, to adjust the hydrophilic/hydrophobic balance in the final polymer, and/or to obtain lower critical solution temperature (LCST) behavior. The azide-substituted hydrophobic organic groups generally have an aliphatic hydrocarbon, for example including linear or branched alkyl or alkenyl hydrocarbons. The hydrophobic aliphatic hydrocarbon can be of variable size depending on the desired properties of the functionalized polymer; common sizes generally range from 1 to 50 carbon atoms, for example from 2 to 30 carbon atoms, 2 to 20 carbon atoms, or 3 to 12 carbon atoms. The hydrophobic organic triazole groups preferably include reaction products of polymer backbone-pendant alkynyl groups and azide-substituted alkanes. For example, suitable azide-substituted alkanes can generally be of the form $N_3[CH_2]_nCH_3$, where n preferably ranges from 2 to 20, for example from 4 to 16 or 6 to 14. Equivalently, the resulting hydrophobic organic triazole group can be represented by -Tr$[CH_2]nCH_3$, where n is as before, and Tr is a 1,4-disubstituted 1,2,3-triazole (i.e., linked to the alkane at the 1-position of the triazole and linked to the polymer backbone via the 4-position of the triazole). Preferred azide-substituted alkanes are 1-azidobutane, 1-azidodecane, and 1-azidohexadecane (i.e., n is 3, 9, and 15, respectively; illustrated in FIG. 9). The hydrophobic organic triazole groups can similarly include reaction products of polymer backbone-pendant alkynyl groups and azide-substituted alkenes. The azide-substituted alkenes are similarly sized to the alkanes, for example including 1-azidooctadec-8-ene (illustrated in FIG. 9). The alkene can be used for further functionalization, cross-linking, and/or to provide a DNA-/RNA-compatible polymer carrier (e.g., the kink in the unsaturated aliphatic chain may be able to decrease the strength of the DNA-/RNA-polymer binding). The azide-substituted alkane/alkenes can be formed by methods generally known in the art, for example by reacting a halogenated alkane/alkene with an azide salt (e.g., 1-bromodecane with sodium azide).

In some embodiments, the poly(glycolide) polymer can be crosslinked. The crosslinking can be intra- or intermolecular in nature. When the crosslinking is intramolecular, covalent triazole links connect neighboring portions of the polymer backbone, for example when the polymer is in a micellar configuration (e.g., in an aqueous solution when hydrophilic organic triazole groups are included as functionalizing moieties), thereby forming a crosslinked nanoparticle. Crosslinking is generally effected by reacting a diazido organic crosslinking compound with two free alkynyl groups on the same or different polymer backbones, thereby forming a di-triazole organic crosslinking group between the two locations. Suitable diazido organic crosslinking compounds include diazido alkanes, for example $N_3[CH_2]_nN_3$, where n preferably ranges from 1 to 20, for example from 2 to 12 or 3 to 8. Preferred diazido alkanes include 1,5-diazidopentane and 1,12-diazidododecane, as illustrated in FIG. 9. The diazido alkanes can be formed, for example, reacting a dihalogenated alkane with an azide salt (e.g., 1,5-dibromopentane with sodium azide).

Lower Critical Solution Temperature Poly(Glycolide) Polymers

This disclosure provides the direct synthesis of functionalized poly(glycolide) polymers that exhibit a Lower Critical Solution Temperature transition (LCST) at physiological relevant temperatures. In short, these materials undergo a solution-to-gel transition that can be adjusted to occur near room temperature. When combined with a therapeutic agent, the polymer can be injected as a liquid to a tumor or other localized area of interest, and as the solution reaches body temperature, it undergoes a phase transition to form a gel. The gel then acts as a "time-release" material, slowly doling out the therapeutic agent to maintain a more constant concentration of the therapeutic agent than is possible through traditional methods. Furthermore, the poly(glycolide) polymers are analogs of polymers used for resorbable sutures, and thus the gel will degrade in vivo.

Figure 7:
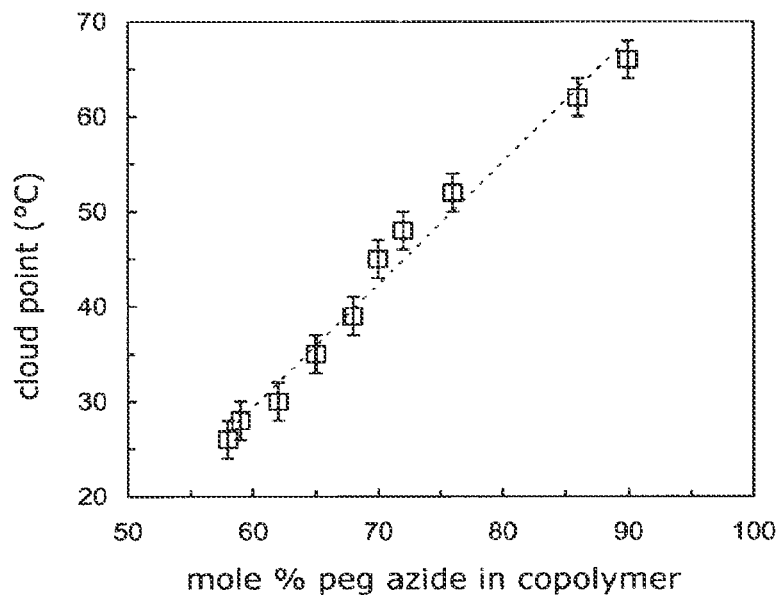
FIG. 7 is a graph showing the relationship between the cloud point observed at 450 nm and the mole percentage PEG azides (i.e., azide-substituted mDEG) "clicked" onto the homopolymer PPGL 6. The broken line is a least-squares fit to the data.

The functionalized poly(glycolide) polymer exhibits LCST behavior when the polymer includes both hydrophobic (e.g., alkyl) and hydrophilic (e.g., polyoxyalkylene, including alkyl-polyoxyalkylene) groups covalently bound to the polymer backbone via triazole linkages. The particular LCST point exhibited by the functionalized polymer depends on the relative ratio, size, and density (i.e., number of functional groups normalized by the polymer backbone length) of the hydrophobic and hydrophilic groups. The LCST can generally range from about 10° C. to about 100° C., for example about 25° C. to about 65° C. as illustrated in FIG. 7 for a poly(glycolide) polymer functionalized with 1-azidodecane and mDEG azide. A particularly biologically relevant LCST range includes about 35° C. to about 40° C., which results in the functionalized polymer gelling at a (human) physiological temperature of about 37° C. The LCST generally increases as does the mol. % incorporation of the hydrophilic groups (i.e., relative to the total number of pendant alkynyl groups in the base, non-functionalized poly(glycolide) polymer). Typical levels of incorporation for the hydrophilic group range from about 50 mol. % to about 95 mol. %, for example about 60 mol. % to about 70 mol. %, with the balance of the pendant alkynyl groups preferably having been functionalized with the hydrophobic groups (i.e., about 5 mol. % to about 50 mol. % or about 30 mol. % to about 40 mol. %).

Figure 6:
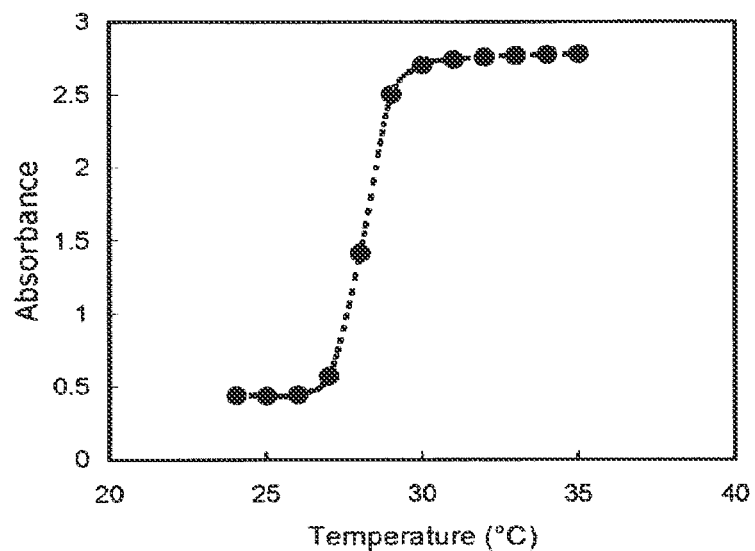
FIG. 6 is a graph showing cloud point determination at 450 nm for PPGL 6 click-functionalized with a mixture of hydrophobic and hydrophobic chains (59% mDEG chains, 41% decyl chains, as determined by $^1$H NMR).

The LCST behavior of the functionalized poly(glycolide) polymer is preferably exhibited over a relatively narrow temperature range. This permits substantially the entire functionalized polymer to rapidly gel once the LCST point is reached upon heating (i.e., there is not a sizable fraction of the functionalized polymer remaining in solution at the LCST) and nonetheless remain a stable solution at a wider range of lower (e.g., room) temperatures. This behavior is illustrated in FIG. 6 in which the solution-to-gel transition for the decyl/mDEG-functionalized polymer occurs over a range of about 3° C. Accordingly, the functionalized polymer preferably has an LCST transition range of about 10° C. or less, for example about 5° C. or less, about 1° C. to about 5° C., or about 2° C. to about 4° C.

When the poly(glycolide) polymer is used as a vehicle for the controlled (spatial and/or temporal) release of a drug or other therapeutic agent. A drug/therapeutic agent generally includes any chemical administered to a living being (e.g., human patient or other animal) to treat, cure, prevent, and/or diagnose a disease or other physical/mental condition of the living being. For drug-delivery applications, drugs/therapeutic agents can be combined with the polymer in a variety of ways. For example, an unmodified (i.e., non-azide substituted) drug can be provided in an (aqueous) solution with the functionalized poly(glycolide) polymer. The solution can be locally injected into a patient at a desired location. The functionalized poly(glycolide) polymer gels rapidly as it reaches body temperature (e.g., an LCST ranging from about 35° C. to about 40° C.), thereby immobilizing or encapsulating the drug in the gel, which in turn stably remains at the localized position of injection. The gel then gradually releases the drug as biodegrades in the patient. Additionally, any of a variety of biologically relevant drugs can be covalently attached to the poly(glycolide) polymer. A particular drug of interest is functionalized using conventional methods so that the drug molecule is azide-substituted (e.g., halogenation or tosylation of an alkyl group followed by reaction with an azide salt, synthesis of aromatic azides from the corresponding amines by reaction with t-butyl nitrite and azidotrimethylsilane, ring-opening of epoxides to form 1,2-azido alcohols, etc.). The drug is then attached to the polymer as the triazole reaction product of the azide-substituted drug and a free pendant alkynyl group along the polymer backbone. In general, any drug that can be modified to include a pendant azide without destroying (or otherwise substantially inhibiting) the activity of the drug can be used. Preferably, an azide tether (i.e., an azide group with an optional linking group between the azide group and the drug) is used that is able to hydrolyze to reveal the drug.

Thus, the foregoing poly(glycolide) polymers can generally be used in a method to deliver a drug compound to a cell (e.g., human (preferable), other animal, plant). The method generally includes (a) providing the drug compound with the poly(glycolide) polymer, and (b) releasing the drug compound to the cell over a period of time. The method can be applied either in vivo (e.g., by injecting the drug/polymer combination into a patient) or in vitro. The drug compound can be provided in the form of a mixture/solution with the poly(glycolide) polymer, in the form of a triazole-substituted drug derivative covalently bound to the poly(glycolide) polymer, or both (e.g., when multiple drugs are to be delivered by polymer composition).

Synthesis and Click Functionalization of Poly(Glycolide) Polymers

The above poly(glycolide) polymer in its various embodiments can be formed by reacting an alkynyl-substituted glycolide in the presence of an initiator (e.g., alcohol) and a metal catalyst (e.g., metal organic catalysts such as metal alkoxides) at a polymerization temperature ranging from about 30° C. to about 180° C. The polymerized alkynyl-substituted glycolide can include the general and specific monomers according to Formulas III and IIIa. The monomers can be formed, for example, by the process described in Example 1. The alkynyl-substituted glycolide can be copolymerized with other monomers (e.g., lactide or other biodegradable polyester monomers) to form a random copolymer. Alternatively, the alkynyl-substituted glycolide first can be polymerized alone to form a poly(glycolide) homopolymer, and the homopolymer then can be copolymerized with other monomers to form a block copolymer. Essentially any catalyst/initiator system that can be used for the conventional polymerization of non-functionalized lactide and/or glycolide (i.e., to form PLA, PGA) can be used, provided that the system components do not react with the alkynyl group. Suitable polymerization initiators generally include alcohols (e.g., linear or branched alkyl; primary, secondary, or tertiary; including aliphatic alcohols having from 1 to 20 or 2 to 10 carbon atoms; for example t-butylbenzyl alcohol), amines (e.g., linear or branched alkyl; primary, secondary, or tertiary; for example an aliphatic amines having from 1 to 20 or 2 to 10 carbon atoms), and polyoxyalkylenes (e.g., PEG or its monomethyl ether, which can be useful since PEGylation can increase the residence time of a polymer in the bloodstream). A variety of metal catalysts are suitable, including tin compounds (e.g., $Sn(2-ethylhexanoate)_2$, other tin(II) alkoxides, tin chloride), antimony compounds (e.g., antimony trioxide, antimony trihalides), zinc compounds (e.g., zinc lactate), aluminum compounds (e.g., aluminum isopropoxide), calcium compounds (e.g., calcium acetylacetonate), lanthanide compounds (e.g., lanthanide alkoxides such as yttrium isopropoxide). A suitable polymerization temperature ranges from about 110° C. to about 150° C.

The poly(glycolide) polymer having pendant alkynyl groups can then be functionalized by reacting an azide-substituted organic compound with the a poly(glycolide) polymer in the presence of a copper salt and a reducing agent in a non-reactive solvent (i.e., non-reactive with the pendant alkynyl groups or other functionalities of the poly(glycolide) polymer, for example a non-aqueous solvent) at about room temperature. This set of click reaction conditions generates Cu(I) in situ based on the interaction of the copper salt and the reducing agent, thereby improving the yield and selectivity of the reaction. The reaction results in the covalent grafting of the organic compound to the poly(glycolide) polymer via a triazole reaction product of the alkynyl group of the polymer and the azido group of the organic compound precursor. Suitable click functionalization conditions include copper (II) sulfate (or other copper(II) salt) as the copper salt, sodium ascorbate as the reducing agent, dimethyl formamide (DMF) as the non-reactive solvent, and the temperature ranges from about 0° C. to about 50° C. (or about 20° C. to about 35° C.).

The foregoing click reaction conditions, while particularly developed for the functionalization of a poly(glycolide) polymer having pendant alkynyl groups, may be applied to other polyester polymers (including copolymers thereof) having pendant alkynyl groups. Specifically, the poly(glycolide) polymer backbone (e.g., characterized by two carbons per polyester repeating unit along the length of the backbone) is relatively sensitive to backbone degradation during triazole formation. Thus, the click functionalization protocol should also be generally applicable (i.e., capable of functionalization via triazole formation without substantial backbone degradation) to a polymer/copolymer including alkynyl-substituted polyester units having from 2 to 10 carbon atoms in the repeating unit along the length of the polymer backbone (e.g., including alkynyl-substituted repeating unit derived from glycolide, lactide, and/or ε-caprolactone).

Figure 10:
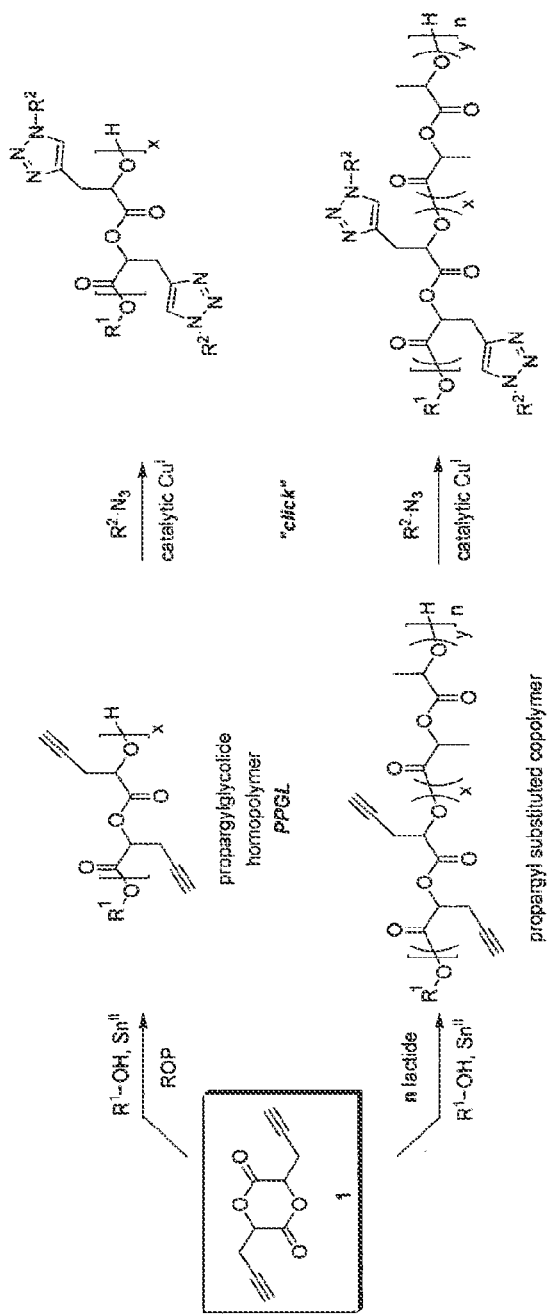
FIG. 10 illustrates generic routes for the synthesis and functionalization of poly(glycolide) polymers While the disclosed compositions and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

Advantages of the disclosed click functionalization conditions include that: (i) the poly(glycolide) polymer backbone is not subject to degradation resulting from the presence of terminal hydroxyl groups in the polymer chain, and (ii) the lack of backbone degradation results in the functionalized poly(glycolide) polymer having a degree of polymerization that is substantially the same as that of the base poly(glycolide) polymer. For example, as illustrated in Formula II and in FIG. 10 (illustrating generic click reactions of poly(glycolide) homo- and copolymers), the poly(glycolide) polymer generally contains one terminal hydroxyl group, even though the other is converted to an ester via interaction with the alcohol initiator. However, the presence of the terminal hydroxyl group does interfere or otherwise degrade the polymer backbone during click functionalization. Thus, there is no need to add a prior process step of protecting the terminal hydroxyl groups, for example by converting both to esters prior to click functionalization. Because there is no substantial backbone degradation during click functionalization, the degrees of polymerization for both the base poly(glycolide) polymer and the functionalized poly(glycolide) polymer are substantially the same (i.e., even though the molecular weight of the functionalized poly(glycolide) polymer increases due to the addition of the azide-substituted organic compound to the polymer). For example, the degree of polymerization of the functionalized poly(glycolide) polymer is at least about 80% (more preferably at least about 90% or at least about 95%) of that of the base poly(glycolide) polymer.

EXAMPLES

The following Examples illustrate the disclosed compositions and methods, but are not intended to limit the scope of any claims thereto. In the Examples, the following materials and techniques were used.

Materials.

10-Azido-2,5,8-trioxadecane (mDEG azide) and methoxypolyethylene glycol 550 azide (mPEG-550 azide) were prepared using literature procedures[33], and 1-azidodecane[34] was synthesized by a modified procedure.[35] Ethyl glyoxylate (Alfa Aesar, 50 wt % in toluene) was distilled before use. THF was dried by passage through a column of activated alumina. DMF was dried over activated 4 Å molecular sieves. Zinc (Spectrum, 20 mesh) was treated with 2M HCl, and then washed sequentially with distilled water and absolute ethanol and dried under vacuum at 60° C. Propargyl bromide (80 wt % in toluene) was purchased from Alfa Aesar. All other chemicals and solvents were ACS reagent grade and used as received from Aldrich, except for triethylene glycol monomethyl ether, which was vacuum distilled.

Characterization.

Polymer molecular weights were determined by gel permeation chromatography (GPC) at 35° C. using two PLgel 10μ mixed-B columns in series and THF as the eluting solvent at a flow rate of 1 mL/min. A Waters 2410 differential refractometer was used as the detector, and monodisperse polystyrene standards were used to calibrate the molecular weights. The concentration of polymer solutions used for GPC was 1 mg/mL. Additional GPC data was obtained using GPC-MALS (Multi-Angle Light Scattering) at 35° C. using THF as the eluting solvent at a flow rate of 1 mL/min. An Optilab rEX (Wyatt Technology Co.) and a DAWN EOS 18 angle light scattering detector (Wyatt Technology Co.) with a laser wavelength of 684 nm were used to calculate absolute molecular weights. $^1$H NMR (300 or 500 MHz) and $^{13}$C NMR (75 or 125 MHz) spectra were acquired in $CDCl_3$ using either a Varian Gemini 300 spectrometer or a Varian UnityPlus 500 spectrometer with the residual proton signals from the solvent used as chemical shift standard. Mass spectral analyses were carried out on a VG Trio-1 Benchtop GC-MS. UV-Vis spectra were recorded with a Cary 300 Bio WinUV, Varian spectrophotometer.

Example 1

Synthesis of Alkynyl-Substituted Glycolide

Monomer Synthesis.

FIG. 8A (Scheme 1) shows the synthetic route to propargyl glycolide, an alkynyl-substituted glycolide monomer. The Reformatsky-type reaction of propargyl bromide with freshly distilled ethyl glyoxylate in the presence of activated zinc generated ethyl 2-hydroxy-4-pentynoate 2 in 51% yield.[36] Elution of the crude reaction mixture through silica gel using a 70:30 mixture of hexane/ethyl acetate readily separated the ester 2 from the reaction byproducts. Hydrolysis of the ester in refluxing water provided 2-hydroxy-3-butynoic acid 3 in 84% yield. Hydrolysis under acidic conditions resulted in lower yields due to side reactions.

Cyclization to give a propargyl glycolide monomer 1 was accomplished by refluxing the acid 3 with catalytic p-toluenesulfonic acid in toluene. Once azeotropic separation of water ceased, the reaction mixture was subjected to a standard aqueous workup. Sublimation of the crude product afforded the monomer 1 in 34% yield as a mixture of rac (RR/SS) and meso (R,S) stereoisomers. The byproducts primarily consisted of linear oligomers, which could in principle be recycled or thermally cracked to yield additional monomer. The 300 MHz $^1$H NMR spectrum of monomer 1 is shown in FIG. 1. The methine protons of the propargyl glycolide isomers appear as a triplet at 5.29 ppm and a doublet of doublets at 5.05 ppm. The 1:1 ratio of the meso to rac diastereomers reflects a statistical coupling of a racemic mixture of hydroxy acids. After recrystallization, the diastereomeric ratio was 2:3, (isomers unassigned).

Synthesis of 2-hydroxy-4-pentynoic acid ethyl ester (2)

Propargyl bromide (~10 g) was added under a blanket of $N_2$ to a 3-L round bottom flask containing 350 mL anhydrous THF and Zn (230 g, 3.5 mol). The mixture was stirred at room temperature for 30 min and then cooled in an ice bath. A toluene solution of ethyl glyoxylate (51 wt %, determined by NMR, 473 g, 2.36 mol) and a toluene solution of propargyl bromide (80 wt %, 352 g, 2.36 mol) were combined in 500 mL dry THF and 700 mL dry ether. This mixture was then added dropwise to the stirred slurry. After the addition was complete, the mixture was stirred at 0° C. overnight. The reaction mixture was then poured into a 4-L Erlenmeyer flask containing 1 L of ice-cold 3M HCl. After separation of the organic layer, the aqueous layer was extracted with ether (3×300 mL) and the combined organic layers were dried over $MgSO_4$. Filtration and removal of the solvents by rotary evaporation gave a dark blue oil, which was purified by column chromatography using silica gel with EtOAc/hexanes (30/70) as the eluent. Vacuum distillation of the resulting material (50-55° C./100 mTorr) gave the ester 2 as a colorless oil (170 g, 51%). $^1$H NMR δ 4.25 (m, 3H), 3.11 (d, 1H, J=6.4 Hz), 2.65 (m, 2H), 2.03 (t, 1H, J=2.7 Hz), 1.28 (t, 3H, J=7.2 Hz). $^{13}$C NMR δ 172.99, 78.53, 71.25, 68.64, 62.11, 24.81, 14.13.

Synthesis of 2-hydroxy-4-pentynoic acid (3)

The ester 2 (170 g) was added to 800 mL of distilled water and heated to reflux for 3 d. After cooling to room temperature, the solution was acidified by the addition of 100 mL of concentrated HCl and continuously extracted with ether for 2 d. The ether solution was diluted to 1.5 L with additional ether and dried over $MgSO_4$ for 2 h. After filtration, the solution was concentrated by rotary evaporation and dried under vacuum to give a light brown solid, which was purified by recrystallization from $CH_2Cl_2$ at 0° C., followed by sublimation at 58° C. and a second recrystallization from $CH_2Cl_2$ at 0° C. to give the acid 3 as colorless crystals (115 g, 84%). $^1$H NMR δ 4.42 (t, 1H, J=5.0 Hz), 2.75 (m, 2H), 2.10 (t, 1H, J=2.6 Hz). $^{13}$C NMR δ 177.28, 77.97, 71.96, 68.51, 24.66. MS (m/z) 115.3 (M+1), mp 61-63° C.

Synthesis of meso/rac-3,6-di-2-propynyl-1,4-dioxane-2,5-dione (1)

2-Hydroxy-4-pentynoic acid (3) (18 g) and p-toluenesulfonic acid monohydrate (1.5 g) were added to a 2-L round bottom flask charged with 1.8 L of toluene. The flask was heated to reflux for 3 d, and the water was removed azeotropically using a Barrett trap. After cooling to room temperature, the toluene was removed by rotary evaporation, and the residue was dissolved in 500 mL $CH_2Cl_2$, washed with saturated $NaHCO_3$ (3×150 mL) and dried over $MgSO_4$. Filtration and removal of the $CH_2Cl_2$ gave the product as a light brown solid which was washed with diethyl ether (3×50 mL), sublimed at 75° C. and recrystallized from toluene to give colorless crystals of the monomer 1 as a meso/rac isomer mixture (6.1 g, 34%). $^1$H NMR δ 5.29 (t, J=4.6 Hz), 5.05 (dd, J=7.1 Hz, J=4.4 Hz), (resonances at 5.29 and 5.05 ppm are from the rac and meso isomers, integrating as 1H; isomers unassigned), 2.95 (m, 2H), 2.17 (t, J=2.6 Hz), 2.11 (t, J=2.7 Hz), (1H total for the signals at 2.17 and 2.11 ppm). $^{13}$C NMR δ 164.26, 163.44, 76.77, 76.67, 74.82, 74.15, 73.34, 72.02, 23.94, 21.24. Anal. Calcd. for $C_{10}H_8O_4$: C, 62.50; H, 4.17 Found: C, 62.80; H, 4.01. HRMS (m/z, M$^+$) expected: 192.0423. found: 192.0419; mp 103-106° C.

Example 2

Polymerization Synthesis of Poly(Glycolide) Polymer

General Procedure for Bulk Polymerizations

Monomer(s) and a small magnetic stir bar were added to ampoules prepared from ⅜ in. diameter glass tubing. The ampoules were connected via a CAJON fitting to a T-shaped vacuum adapter fitted with a stopcock and an air-free Teflon valve. The apparatus was attached to a vacuum line and evacuated through the Teflon valve. The ampoule was back-filled with argon, and predetermined amounts of the tin(II)-2-ethylhexanoate (Sn(2-ethylhexanoate)$_2$) and 4-tert-butylbenzyl alcohol solutions (~0.03 M in toluene) were added via syringe to the ampoules through the stopcock. After removing solvent in vacuo, the ampoule was flame-sealed. Sealed ampoules were immersed in an oil bath at 130° C. for the desired period of time and the melt was stirred magnetically. At the end of the polymerization, the ampoule was removed from the bath, cooled in ice water and opened. A portion of the crude mixture was analyzed by NMR for conversion. The remaining polymer was dissolved in CH$_2$Cl$_2$ and precipitated by adding the solution to cold methanol. This process was repeated four times, after which the resulting polymer was dried under vacuum (4 mTorr) at 40° C. for 24 h. Representative syntheses of homopolymers, random copolymers, and block copolymers are described below.

Example 2a

Synthesis of Poly(Propargyl Glycolide) Polymer

Bulk polymerizations of the propargyl glycolide monomer 1 at 130° C., catalyzed by Sn(2-ethylhexanoate)$_2$ using t-butylbenzyl alcohol as the initiator, yielded poly(propargyl glycolide) PPGL (FIG. 8B, Scheme 2). The catalyst to initiator ratio was 1:1 for all polymerizations, and the monomer to initiator ratio was varied from 50:1 to 300:1 to provide different molecular weight materials. Conversion of monomer to polymer was calculated by comparing the $^1$H NMR integration of the monomer methine peaks at 5.05 and 5.29 ppm (monomer) with those in the polymer at ~5.38 ppm (FIG. 1).

Typical results for the bulk polymerization of propargyl glycolide at different monomer to initiator ratios are listed in Table 1. The molecular weights measured by GPC range from 9,000-60,000 g/mol and are in good agreement with their theoretical values. In addition, the polydispersities are fairly narrow for bulk polymerizations (e.g., PDIs ranging from about 1.1 to about 1.5 with degrees of polymerization ranging from about 40 to about 300), especially for polymerizations run at high monomer to initiator ratios.

TABLE 1

Bulk Polymerization of Propargyl Glycolide Monomer[a]

| Entry | [M]/[I] | Time (min) | Conversion (%)[b] | $\overline{x}_n^{calc}$[c] | $\overline{x}_n^{expd}$[d] | $M_n^e$ (g/mol) | PDI |
|---|---|---|---|---|---|---|---|
| 1 | 50 | 10 | 85 | 43 | 47 | 9,100 | 1.13 |
| 2 | 100 | 15 | 89 | 89 | 96 | 18,500 | 1.21 |
| 3 | 150 | 25 | 91 | 136 | 149 | 28,600 | 1.30 |
| 4 | 200 | 30 | 73 | 146 | 159 | 30,500 | 1.31 |
| 5[d] | 250 | 55 | 78 | 195 | 199 | 38,300 | 1.37 |
| 6 | 300 | 60 | 90 | 270 | 284 | 54,600 | 1.38 |
| 7 | 300 | 75 | 94 | 280 | 294 | 56,500 | 1.49 |

Notes:
[a]Using Sn(2-ethylhexanoate)$_2$ as the catalyst and t-butylbenzyl alcohol as initiator.
[b]Measured by $^1$H NMR.
[c]Calculated from the monomer to initiator ratio and corrected for conversion.
[d]Calculated by dividing M$_n$ by the formula weight of monomer 1.
[e]Measured by GPC in THF and calibrated using polystyrene standards.

Figure 2:
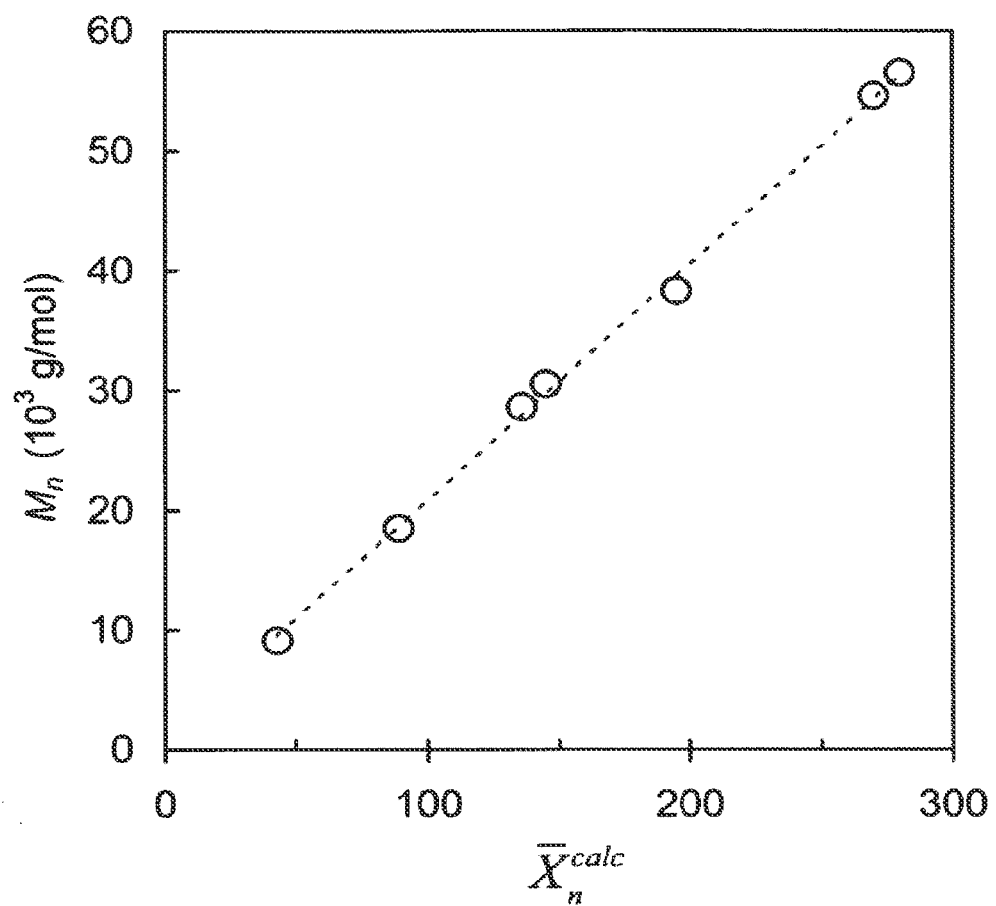
FIG. 2 is a graph showing the relationship between the number-average molecular weight ($M_n$) and calculated degree of polymerization ($X_n$) for the bulk polymerization of propargyl glycolide 1 at 130° C. using Sn(2-ethylhexanoate)$_2$ as a catalyst and t-butylbenzyl alcohol as an initiator. The line is a least-squares fit to the data.

FIG. 2 shows a plot of the molecular weight (measured by GPC) as a function of the calculated average degree of polymerization, $\overline{X}_n^{calc}$, determined by multiplying the monomer to initiator ratio by percent conversion. The linear relationship seen in the data is the signature of well-defined initiation and the PDIs suggest that intramolecular transesterification is insignificant.

Polymerization of Meso/Rac-Propargyl Glycolide Monomer 1.

The meso/rac-propargyl glycolide monomer 1 (2.49 g) ([M]/[I]=150) was polymerized for 25 min. The conversion of monomer to polymer calculated from $^1$H NMR was 91%. The poly(propargyl glycolide) (PPGL) was obtained as a light brown solid (2.16 g, 87%). $^1$H NMR: δ 5.31-5.46 (br, 1H), 2.79-3.03 (brm, 2H), 2.01-2.18 (br, 1H); GPC (THF): M$_n$=28, 600 g/mol, PDI=1.30.

Example 2b

Synthesis of Poly(Propargyl Glycolide-co-Lactide) Polymer

Control of the density and position of functional groups along the polymer backbone is important when optimizing the performance of biodegradable polymers for particular applications. Accordingly, a study as to the suitability of the meso/rac-propargyl glycolide monomer 1 for preparing random and block copolymers with lactide was performed. To assess random copolymerization, a copolymer of rac-lactide incorporating 8 mol. % of the monomer 1 was targeted with a degree of polymerization $\overline{X}_n$=300. Using the same conditions and workup for preparing PPGL, the copolymer was obtained in 95% yield. The incorporation of the monomer 1 was determined by integrating the $^1$H NMR resonance for the propargyl methylene groups at δ 2.85 against the polymer backbone methine resonances centered about δ 5.20. The value of 7.9% calculated in this fashion agrees with the targeted value of 8%. GPC analysis returned $\overline{M}_n$=83,200 g/mol with a PDI of 1.20. These data reflect a well-behaved polymerization where $\overline{X}_n^{expti}=558$ is slightly higher than the targeted value.

Figure 3:
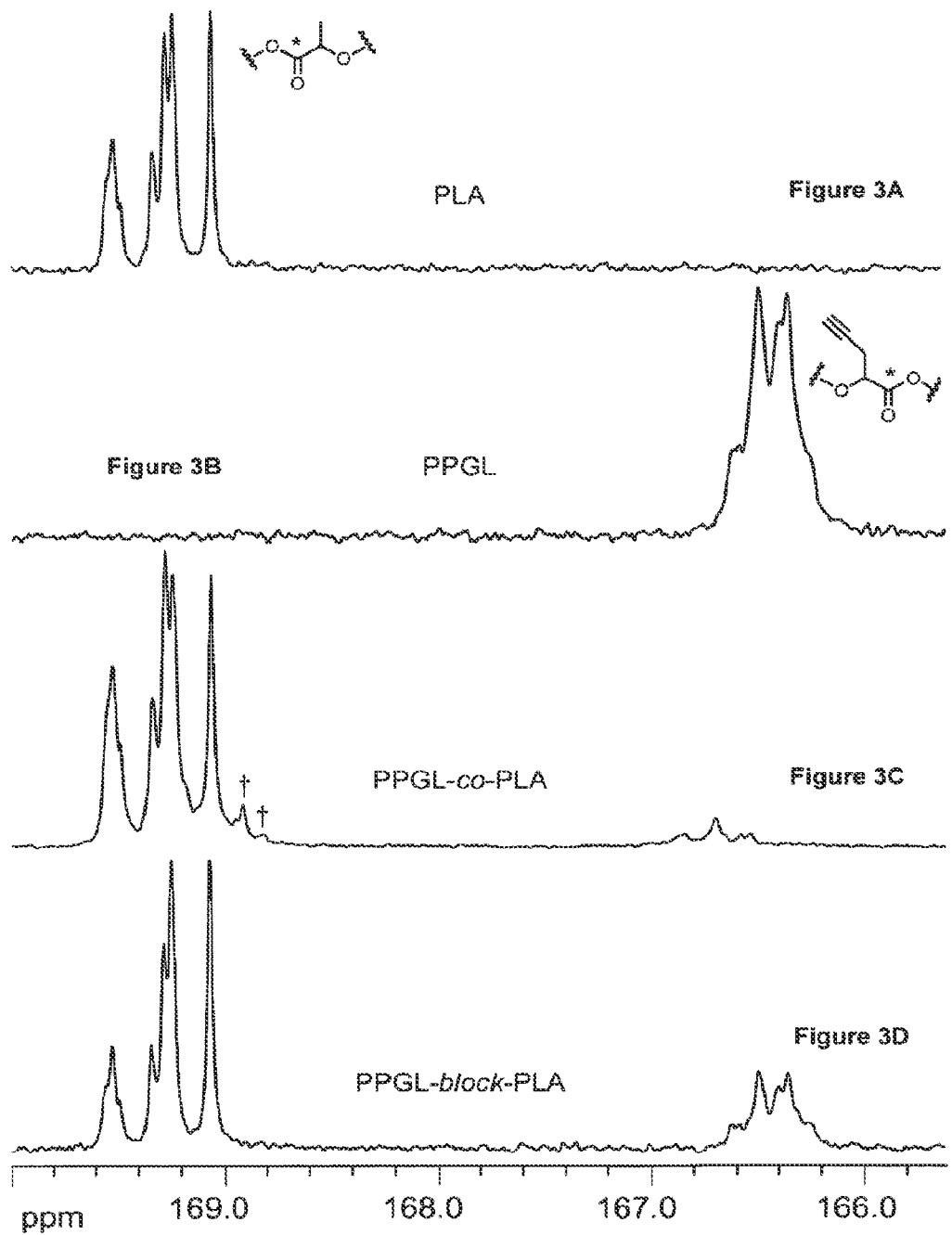
FIGS. 3A to 3D show 75 MHz $^{13}$C NMR carbonyl region spectra of polylactide (PLA) (3A), PPGL 6 (3B), a random copolymer PPGL-co-PLA 7 (3C), and a block copolymer PPGL-block-PLA 8 (3D). Run in CDCl$_3$. The symbol "l" represents unique lactide carbonyl resonances in PLA-co-PPGL 7.

The reactivity ratios for the meso/rac-monomer 1 and the rac-lactide have not been determined; accordingly, unambiguous assignment of the polymer microstructure has not been made. Nonetheless the carbonyl regions of $^{13}C$ NMR spectra for the homopolymers and copolymers differ significantly and may bear on the polymer microstructure. As clearly indicated in FIG. 3, replacing the methyl substituents in PLA with propargyl groups results in an approximate 3.0 ppm upfield shift and a slight broadening of the carbonyl resonances in PPGL. For PLA-co-PPGL, the "glycolide" carbonyl resonances have virtually identical chemical shifts and intensities to homopolymer. However, the copolymer has unique peaks at 168.9 and 168.8 ppm. The slight upfield shift suggests that these resonances arise from carbonyls in lactide units flanking propargyl monomer insertions. Indeed, the low intensities of these resonances are consistent with the 8 mol. % incorporation of the propargyl monomer in the copolymer. When compared to the homopolymer PPGL, the resonances for propargyl glycolide carbonyls are shifted downfield by 0.2 ppm toward the "lactide" region. Using similar arguments to those above, this observation is consistent with the majority of the propargyl units having lactide nearest neighbors. Based on these data, and the $^{13}C$ NMR spectrum of a block copolymer formulation (see below), PLA-co-PPGL is most likely a statistical copolymer.[38]

Copolymerization of Meso/Rac-Propargyl Glycolide Monomer 1 and Rac-Lactide.

A mixture of meso/rac-propargyl glycolide monomer 1 (0.384 g, 2 mmol) and rac-lactide (3.394 g, 23.6 mmol) ([M]/[I]=300) was polymerized for 50 min. Precipitation and drying under vacuum gave the random copolymer as a colorless solid (3.59 g, 95%). $^1H$ NMR: δ 5.03-5.39 (br m, 12.7H), 2.75-2.96 (br m, 2H), 1.97-2.11 (br, 1H), 1.43-1.65 (br m, 38.8H); GPC (THF, light scattering and refractive index detectors): $M_n$=83,200 g/mol, PDI=1.20.

Example 2c

Synthesis of Poly(Propargyl Glycolide-block-Lactide) Polymer

Because statistical and block copolymers have distinct physical properties, a PPGL-PLA block copolymer was another important target. The synthesis of PPGL-block-PLA (FIG. 8B, Scheme 2) was accomplished by using scrupulously purified PPGL ($\overline{M}_n$28,500 g/mol, $\overline{X}_n^{expti}$~150, PDI=1.30) as a macroinitiator ($I_M$) and Sn(2-ethylhexanoate)$_2$ as the catalyst for rac-lactide polymerization ([rac-lactide]: [$I_M$]: [Cat]=1000:1:1). The polymerization was carried out in THF at 70° C. and stopped at low lactide conversion to minimize transesterification. GPC traces show a shift to higher molecular weight with the PDI increasing slightly ($\overline{M}_n$=38,000 g/mol, $\overline{X}_n^{expti}$~215, PDI=1.44). The increase in $\overline{M}_n$ is consistent with addition of 65 lactide units, on average, to the polymer chain. The small change in PDI suggests that intramolecular transesterification is minimal, consistent with a block architecture for the copolymer. The $^{13}C$ NMR spectrum in FIG. 3 further supports the block microstructure. Specifically, the chemical shifts and relative intensities of the resonances in the "lactide" and "propargyl glycolide" regions are virtually identical to those in the corresponding homopolymers. Notably absent are high-field resonances in the "lactide" region and low-field resonances in the "propargyl glycolide" region, which were attributed to consecutive enchainment of the meso/rac-glycolide monomer 1 and rac-lactide when these monomers were copolymerized.

Preparation of PPGL-Block-PLA.

PPGL (1.0 g, $\overline{M}_n$ (GPC)=28,500, PDI=1.30) and rac-lactide (5.0 g) were placed in a 25 mL Schlenk flask fitted with a vacuum adapter. The flask was sealed and held under vacuum overnight to remove residual water. After the flask was filled with nitrogen through the sidearm, 1.21 mL of a 0.0288 M solution of Sn(2-ethylhexanoate)$_2$ in toluene and 8 mL of anhydrous THF were added via syringe through a septum that was fitted to the vacuum adapter. The flask was closed and placed in an oil bath at 70° C., where the solution was magnetically stirred for 10 h. At the end of the polymerization, the polymer was isolated by precipitation into cold methanol. Dissolution and precipitation was repeated four more times. The resulting colorless solid was dried under vacuum at 45° C. overnight to give the block copolymer (2.8 g, 47% yield). $^1H$ NMR: δ 5.31-5.44 (br, 1H), 5.06-5.25 (br m, 2.6H), 2.80-3.02 (br m, 2H), 2.05-2.14 (br, 1H), 1.48-1.62 (br m, 8.1H); GPC (THF): $M_n$=38,000 g/mol, PDI=1.44.

Example 3

Functionalization of Poly(Glycolide) Polymer

The disclosed processes and resulting poly(glycolide) polymers have several advantages relative to other approaches: (1) substantially no reduction in molecular weight (i.e., degree of polymerization) upon click functionalization, (2) no need to protect terminal polyester hydroxyl groups upon click functionalization, and (3) the in situ formation of Cu(I) during click functionalization to enhance selectivity and reduce undesired by-products. Emick et al. have reported the Cu-catalyzed "click" functionalization of pendant acetylenes incorporated into polycaprolactone.[5] Unfortunately, their conditions (aqueous CuSO$_4$, 80° C., 10-12 h) proved to be too harsh for PPGL as GPC analysis indicated significant reduction of $\overline{M}_n$ when PPGL ($\overline{M}_n$=56,500, PDI=1.49) was stirred in an acetone/water mixture at 50° C. for 8 h. This result was not surprising since the polylactide backbone is more sensitive to degradation than polycaprolactone. Recently, Jérôme et al. reported the "click" functionalization of a copolymer prepared from an azide-functionalized caprolactone and lactide using milder conditions, CuI in THF at 35° C.[7] However, esterification of the terminal hydroxyl group was necessary to suppress backbone degradation, which complicates the synthetic procedure. Another drawback to Jérôme's approach is the observation that preformed copper (I) salts often exhibit reduced selectivity and generate undesired by-products when employed as catalysts.[27]

General Procedure for "Click" Functionalization.

The desired amount of alkynyl-substituted glycolide polymer, azide-substituted functionalizing compound (1-3 equivalents with respect to pendant alkynyl groups in the poly(glycolide) polymer), and 12 mol. % sodium ascorbate were dissolved in DMF. The resulting solution was transferred to a Schlenk flask and deoxygenated through three freeze-pump-thaw cycles. After the solution had warmed to room temperature, a 0.1 M solution of CuSO$_4$·5H$_2$O in deoxygenated DMF (5 mol % with respect to the acetylene groups) was added under nitrogen, and the reaction mixture was then stirred at room temperature for 2 h. At the end of the reaction, the solids in the reaction mixture were removed by filtration. The polymer was isolated by dialysis (MWCO=12-14,000) in acetone/water (1:1) overnight, and then dried under vacuum.

Example 3a

Synthesis of Alkyl-Grafted Poly(Glycolide) Polymer

Problems associated with the other approaches were solved by carrying out the "click" reaction in the presence of copper(II) sulfate ($CuSO_4$) and sodium ascorbate in DMF at room temperature (FIG. 8C, Scheme 3). The azide-substituted organic compound, 1-azidodecane, was synthesized from 1-bromodecane and sodium azide. To test the DMF conditions, PPGL ($\overline{M}_n$=35,500, PDI=1.44), 1-3 equiv of 1-azidodecane and 12 mol. % sodium ascorbate were dissolved in DMF (all equivalents and mole percentages are with respect to acetylene units in PPGL). A DMF solution of $CuSO_4 \cdot 5H_2O$ (5 mol %) was then added via syringe. $^1H$ NMR spectra taken after 2 h showed that resonances at 2.85 ppm (—$CH_2$—CCH) and 2.05 ppm (—$CH_2$—CCH) had completely disappeared and a new peak appeared at 7.6 ppm (H of the triazole ring) indicating quantitative formation of the triazole. Notably, the low solubility of sodium ascorbate in DMF had no discernable effect on the reaction.

Figure 4:
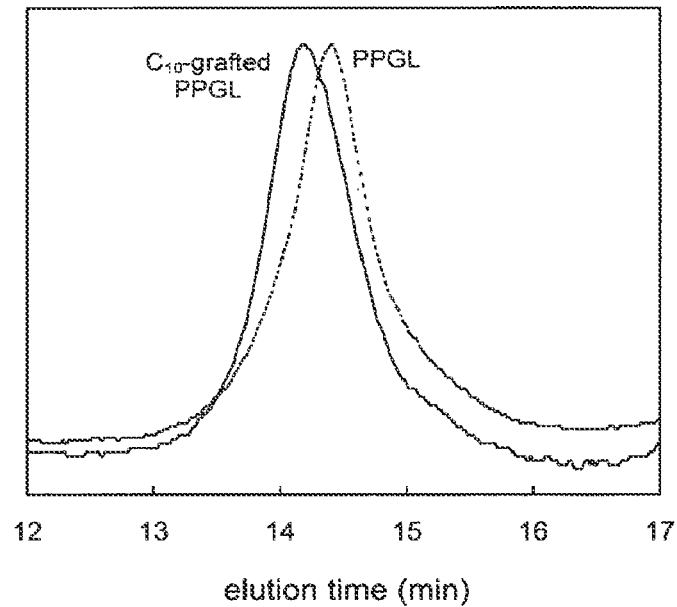
FIG. 4 is a graph showing GPC traces of PPGL 6 (broken line) and C$_{10}$-grafted PPGL 4 (solid line). The polymers were analyzed in THF at 35° C., at a 1 mL/min flow rate.

The GPC results (FIG. 4) of the resulting alkyl-grafted polymer 4 ($\overline{M}_n$=49,400, PDI=1.41) confirmed an increase in molecular weight, with the symmetry of the polymer peak and its molecular weight distribution unchanged.[38] These experimental results strongly suggest that the backbone does not degrade under our modified "click" reaction protocol. To further confirm the stability of the polymer backbone under these conditions, PPGL ($\overline{M}_n$=32,600, PDI=1.45) was treated using the same experimental protocol (DMF, r.t., 0.12 eq. sodium ascorbate, 0.05 eq. $CuSO_4$, 2 h) without adding 1-azidodecane. The GPC trace showed no significant change in molecular weight or PDI ($\overline{M}_n$=32,100, PDI=1.44). Thus, click functionalization of PPGL can be effected quantitatively in DMF at room temperature without significant backbone degradation by generating Cu(I) in situ. The lower reaction temperature minimized the formation of undesired by-products, and protection of the chain end hydroxyl group was unnecessary.

n-Decyl-Grafted PPGL.

PPGL (54 mg, $M_n$(GPC)=35,500 g/mol, PDI=1.44) and 300 mg of 1-azidodecane were dissolved in 5 mL DMF for the click functionalization reaction. The n-decyl-grafted PPGL was isolated as a pale green solid (133 mg, 87%) with $M_n$ (GPC, THF)=49,400, PDI=1.41.

Example 3b

Synthesis of PEG-Grafted Poly(Glycolide) Polymer

Previous work on mPEG-substituted polyglycolides suggested that grafting mPEG chains onto a PPGL should provide hydrophilic and perhaps water-soluble polyglycolides.[39] PEG-550 monomethyl ether (mPEG-550) was selected as the azide-substituted organic compound because of its ready availability from commercial suppliers. It was tosylated and then reacted with sodium azide to afford mPEG-550 azide. The azide group was easily identified by its IR absorption at 2105 $cm^{-1}$, the α-methylene resonance at 3.38 ppm in its $^1H$ NMR spectrum, and the C-α resonance at 50.5 ppm in its $^{13}C$ NMR spectrum. The click PEGylation of PPGL was performed using the alkyl grafting conditions described above (FIG. 8C, Scheme 3). Completion of the reaction was again confirmed by the disappearance of the $^1H$ NMR resonances at 2.85 ppm (—$CH_2$—CCH) and 2.05 ppm (—$CH_2$—CCH) and the appearance of a new resonance at 7.6 ppm (H of triazole). The crude PPGL-graft-mPEG-550 5 was purified by dialysis in an acetone/water (1:1) mixture. After drying under vacuum, the functionalized polymer 5 was isolated as a viscous liquid, tinted light green due to traces of Cu(II). Direct GPC analysis of the polymer 5 was problematic. When THF was used as solvent, the polymer was not detected eluting from the column. It was speculated that either the polymer and THF were isorefractive, the polymer had degraded, or the polymer had adsorbed onto the column. Several control experiments were performed to rule out backbone degradation during click PEGylation. PPGL ($\overline{M}_n$=32,600, PDI=1.45) was first subjected to the same experimental conditions (DMF, RT, 0.12 eq. sodium ascorbate, 3 eq. of mPEG-550 azide, 2 h), but in the absence of $CuSO_4$. GPC results for the recovered PPGL ($\overline{M}_n$=32,200, PDI=1.44) showed no sign of backbone degradation. In a related experiment, a mixture of PPGL ($\overline{M}_n$=32,600, PDI=1.45) and polylactide ($\overline{M}_n$=18,600, PDI=1.26) was subjected to the click mPEG grafting conditions. GPC results for the treated polylactide ($\overline{M}_n$=18, 300, PDI=1.26) again showed no decrease in molecular weight.

mPEG-550-Grafted PPGL.

PPGL (100 mg), $M_n$(GPC)=35,500 g/mol, PDI=1.44) and mPEG-550 azide (1.72 g) were dissolved in 10 mL DMF for the click functionalization reaction. The mPEG-550-grafted PPGL was isolated as a pale green oil (514 mg, 77%).

Example 3c

Synthesis of PEG-Grafted Poly(Propargyl Glycolide-co-Lactide) Polymer

Figure 5:
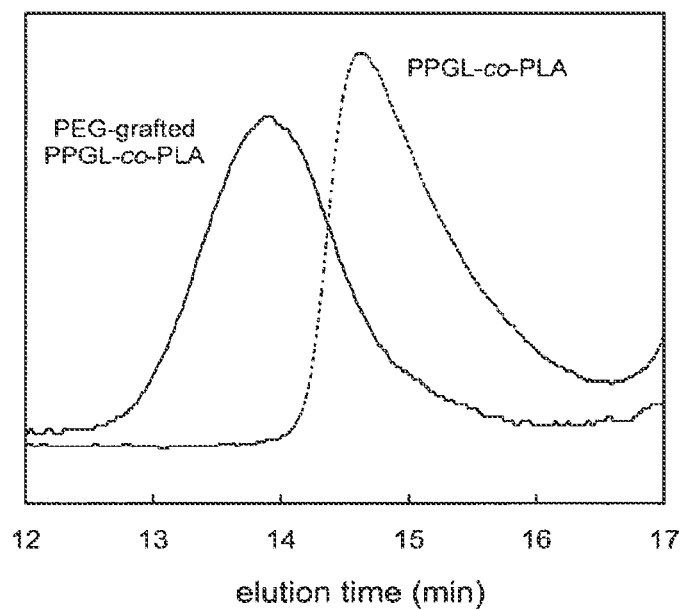
FIG. 5 is a graph showing GPC traces of PPGL-co-PLA 7 (broken line) and PEG-grafted PPGL-co-PLA (solid line). The concentration of propargyl glycolide in the copolymer was 8 mol. %. The polymers were analyzed in THF at 35° C., at a 1 mL/min flow rate.

If the problem with detection of the functionalized polymer 5 was isorefraction with THF, altering the polymer composition sufficiently should resolve the detection issue. To accomplish this, the PLA-co-PPGL copolymer including 92 mol. % lactide and 8 mol. % propargyl glycolide ($\overline{M}_n$, GPC=63,600, PDI=1.66) was evaluated. The copolymer was grafted with mPEG-550 azide using the identical conditions in Scheme 3 to afford the PLA-co-PPGL-graft-mPEG-550. GPC analysis of this mPEG-grafted copolymer showed a shift of peak molecular weight to longer retention time than the starting copolymer (FIG. 5), indicating a lower relative molecular weight ($\overline{M}_n$, GPC=16,800, PDI=1.43). This result was at odds with the results of previous control experiments, which showed no change in molecular weight for polymers under "click" conditions. A decrease in the hydrodynamic radius of the polymer after mPEG grafting could account for the apparent decrease in molecular weight determined by GPC. Using a GPC system equipped with a light scattering detector to determine molecular weight, the molecular weight of the mPEG-grafted copolymer ($\overline{M}_n$, LS=156,000, PDI=1.21) was indeed higher than that of the starting copolymer ($\overline{M}_n$, Ls=83, 200, PDI=1.20). Gratifyingly, the $\overline{M}_n$, Ls value for the PEG-grafted copolymer is only slightly larger than the theoretical value of 136,000 g/mol calculated using the average number of propargyl groups in the polymer chain and $\overline{M}_n$, LS=83,200 for PLA-co-PPGL, with the assumption that all alkyne groups have undergone cycloaddition. Thus, the combined results from these control experiments ruled out backbone degradation during the click PEGylation of propargyl glycolide homopolymers and copolymers, and also uncovered interesting solvent-induced changes in the size of the mPEG-550-grafted polymer.

Poly(Propargyl Glycolide-Co-Lactide) Grafted with mPEG-550.

PPGL-co-PLA (550 mg) and mPEG-550 azide (990 mg) were dissolved in 20 mL DMF for the click functionalization reaction. The product was isolated as a light green rubbery solid (650 mg, 74%); GPC (THF, light scattering): $M_n$=1.56× $10^5$ g/mol, PDI=1.21.

Poly(Propargyl Glycolide-Block-Lactide) Grafted with mPEG-550.

The block copolymer PPGL-block-PLA (300 mg) and mPEG-550 azide (1.78 g, 3.2 mmol) were dissolved in 20 mL DMF for the click functionalization reaction. The product was isolated as a light green viscous liquid (690 mg, 78%). This grafted block copolymer was synthesized to aid in the interpretation of the NMR spectra of other polymers (FIGS. 3A-3D).

Example 4

LCST of PEG/Alkyl-Grafted Poly(Glycolide) Polymer

Recently, several polymer systems have been investigated that exhibit LCST behavior in aqueous solutions.[40] At the LCST, these materials undergo a solution-gel transition that corresponds to the entropically driven expulsion of solvating water molecules from the polymer. Such materials have a variety of interesting and potentially useful applications. For example, a thermally responsive bioadhesive surface becomes resistant to protein adsorption below its LCST, enabling facile growth and harvesting of biomaterials from surfaces.[41-42] The most widely studied polymers that exhibit are LCST behavior are poly(methacrylates), poly(N-isopropylacrylamide) (PNIPAM), and polymers derived that contain thermosensitive PNIPAM segments.[43] Unfortunately, neither poly(methacrylates) nor PNIPAM are degradable, and acrylamides pose health risks.[44] Recent research on responsive LCST materials, especially those that contain mPEG segments[45-53], shows that tuning the hydrophobic/hydrophilic balance in materials can shift the LCST over a broad temperature range.[46,54-55] The few examples of LCST materials based on biodegradable polymers[54-57] and the breadth of applications for polylactides in medical applications[58] made the synthesis of biodegradable LCST materials an ideal venue for showcasing the facile and versatile elaboration of PPGL using click chemistry.

The design of the functionalized poly(glycolide) polymer-based thermally responsive materials uses the chemistry depicted in Scheme 4 (FIG. 8D). Using PPGL as a scaffold, click functionalization using mixtures of 1-decyl and mDEG azides was performed. $^1$H NMR confirmed that the side chain compositions in the resulting polymers were comparable to the ratio of the azides in the feed. After isolating the polymer and purification by dialysis, cloud point measurements were used to screen samples for LCST behavior. Samples were dissolved in Milli-Q water and solution turbidity was monitored by measuring absorbance at 450 nm as a function of temperature. At the LCST, the "apparent absorbance" increases as gel formation causes a dramatic increase in scattering. A representative plot in FIG. 6 shows the transition to be relatively sharp, spanning a temperature range of ~3° C.

Significantly, the relationship between the cloud point temperature and the mole fraction of mDEG chains in the polymer is substantially linear, as shown in FIG. 7. This allows for relatively precise adjustment of the LCST in a degradable material, where the mDEG/alkyl ratio serves as a "molecular thermostat" for the LCST. The results suggest that it may be possible to expand the LCST window to beyond the 25° C.-65° C. range shown in FIG. 7 by varying the lengths of the alkyl and PEG side chains.

mDEG-Grafted PPGL.

PPGL (250 mg, $M_n$(GPC)=35,500 g/mol, PDI=1.44) and mDEG azide (1.480 g) were dissolved in 20 mL DMF for the click functionalization reaction. The mDEG-grafted PPGL was isolated as a light green elastomer (590 mg, 79%).

n-Decyl/mlDEG-Grafted PPGL.

PPGL (122 mg) $M_n$(GPC)=35,500 g/mol, PDI=1.44, 1-(2-azidoethoxy)-2-(2-methoxyethoxy) ethane (480 mg, 2.6 mmol), (mDEG azide) and 1-azidodecane (240 mg, 1.3 mmol) were dissolved in 10 mL of DMF for the click functionalization reaction. The product was isolated as a light green elastomer (320 mg, 88%). $^1$H NMR: δ 7.36-7.78 (br, 1H), 5.22-5.56 (br, 1H), 4.36-4.56 (br, 1H), 4.12-4.36 (br, 1.1H), 3.73-3.91 (br, 1H), 0.70-0.94 (br, 1.7H).

Propargyl glycolide 1 provides a convenient platform for the click functionalization of poly(glycolide) polymers. The alkynyl-substituted glycolide monomer undergoes controlled polymerization to yield poly(propargyl glycolide), a poly (glycolide) polymer with pendant alkynyl groups. The preparation of random and block copolymers of propargyl glycolide with lactide is also straightforward. The development of milder click reaction conditions allows for facile preparation of functionalized polyglycolides, while avoiding backbone degradation and eliminating the need to end-cap the polyester chain. Click functionalization of these alkynyl-containing polyglycolides with organic azides provides mPEG-550-grafted water-soluble polyglycolides, mPEG-550-grafted random copolymers, and new amphiphilic block copolymers. Grafting mixtures of mDEG and alkyl azides provides water-soluble polymers that show lower critical solution temperature (LCST) behavior. Notably, a new family of biodegradable LCST materials can be accessed where the transition temperatures can be tuned in a range from 25° C.-65° C. by simply adjusting the mDEG:alkyl ratio in the azide feed. Considering polylactide's sensitivity to backbone degradation, this protocol should also be applicable to the click functionalization of a range of polyesters and their copolymers.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

Throughout the specification, where the compositions or processes are described as including components, steps, or materials, it is contemplated that the compositions, processes, or apparatus can also comprise, consist essentially of, or consist of, any combination of the recited components or materials, unless described otherwise. Combinations of components are contemplated to include homogeneous and/or heterogeneous mixtures, as would be understood by a person of ordinary skill in the art in view of the foregoing disclosure.

REFERENCES

1. Parrish, B. and T. Emrick, Aliphatic polyesters with pendant cyclopentene groups: Controlled synthesis and conversion to polyester-graft-PEG copolymers, Macromolecules, 2004, 37(16): p. 5863-5865
2. Benabdillah, K. M., et al., Synthesis and characterization of novel degradable polyesters derived from D-gluconic and glycolic acids, Macromolecules, 1999, 32(26): p. 8774-8780
3. Trollsas, M., et al., Hydrophilic aliphatic polyesters: Design, synthesis, and ring-opening polymerization of functional cyclic esters, Macromolecules, 2000, 33(13): p. 4619-4627
4. Kimura, Y., et al., Ring-Opening Polymerization of 3(S)-[(Benzyloxycarbonyl)Methyl]-1,4-Dioxane-2,5-Dione—A New Route to a Poly(Alpha-Hydroxy Acid) with Pendant Carboxyl Groups, Macromolecules, 1988, 21(11): p. 3338-3340
5. Parrish, B., R. B. Breitenkamp and T. Emrick, PEG- and peptide-grafted aliphatic polyesters by click chemistry, Journal of the American Chemical Society, 2005, 127(20): p. 7404-7410
6. Rieger, J., et al., Lactone end-capped poly(ethylene oxide) as a new building block for biomaterials, Macromolecules, 2004, 37(26): p. 9738-9745
7. Riva, R., et al., Combination of ring-opening polymerization and "click" chemistry towards functionalization of aliphatic polyesters, Chemical Communications, 2005, 2005(42): p. 5334-5336
8. Mecerreyes, D., et al., Ring-opening polymerization of 6-hydroxynon-8-enoic acid lactone: Novel biodegradable copolymers containing allyl pendent groups, Journal of Polymer Science Part a-Polymer Chemistry, 2000, 38(5): p. 870-875
9. Vogeley, N. J., G. L. Baker and M. R. Smith, III, Synthesis and polymerization of derivatized lactide monomers, Polymer Preprints (American Chemical Society, Division of Polymer Chemistry), 2005, 46(1): p. 336
10. Lutz, J. F., 1,3-Dipolar cycloadditions of azides and alkynes: A universal ligation tool in polymer and materials science, Angewandte Chemie-International Edition, 2007, 46(7): p. 1018-1025
11. Binder, W. H. and R. Sachsenhofer, 'Click' chemistry in polymer and materials science, Macromolecular Rapid Communications, 2007, 28(1): p. 15-54
12. Dirks, A. J. T., et al., Preparation of biohybrid amphiphiles via the copper catalysed Huisgen [3+2] dipolar cycloaddition reaction, Chemical Communications, 2005, 2005(33): p. 4172-4174
13. Opsteen, J. A. and J. C. M. van Hest, Modular synthesis of block copolymers via cycloaddition of terminal azide and alkyne functionalized polymers, Chemical Communications, 2005, 2005(1): p. 57-59
14. Diaz, D. D., et al., Click chemistry in materials synthesis. 1. Adhesive polymers from copper-catalyzed azide-alkyne cycloaddition, Journal of Polymer Science Part a-Polymer Chemistry, 2004, 42(17): p. 4392-4403
15. Joralemon, M. J., et al., Dendrimers clicked together divergently, Macromolecules, 2005, 38(13): p. 5436-5443
16. Malkoch, M., et al., Structurally diverse dendritic libraries: A highly efficient functionalization approach using Click chemistry, Macromolecules, 2005, 38(9): p.
17. Wu, P., et al., Efficiency and fidelity in a click-chemistry route to triazole dendrimers by the copper(I)-catalyzed ligation of azides and alkynes, Angewandte Chemie-International Edition, 2004, 43(30): p. 3928-3932
18. Wu, P., et al., Multivalent, bifunctional dendrimers prepared by click chemistry, Chemical Communications, 2005, 2005(46): p. 5775-5777
19. Englert, B. C., S. Bakbak and U. H. F. Bunz, Click chemistry as a powerful tool for the construction of functional poly(p-phenyleneethynylene)s: Comparison of pre- and postfunctionalization schemes, Macromolecules, 2005, 38(14): p. 5868-5877
20. Gao, H., et al., Gradient Polymer Elution Chromatographic Analysis of a,w-Dihydroxypolystyrene Synthesized via ATRP and Click Chemistry, Macromolecules, 2005, 38(22): p. 8979-8982
21. Lutz, J. F., H. G. Borner and K. Weichenhan, Combining atom transfer radical polymerization and click chemistry: A versatile method for the preparation of end-functional polymers, Macromolecular Rapid Communications, 2005, 26(7): p. 514-518
22. Malkoch, M., et al., Orthogonal approaches to the simultaneous and cascade functionalization of macromolecules using click chemistry, Journal of the American Chemical Society, 2005, 127(42): p. 14942-14949
23. O'Reilly, R. K., et al., Functionalization of micelles and shell cross-linked nanoparticles using click chemistry, Chemistry of Materials, 2005, 17(24): p. 5976-5988
24. Sumerlin, B. S., et al., Highly efficient "click" functionalization of poly(3-azidopropyl methacrylate) prepared by ATRP, Macromolecules, 2005, 38(18): p. 7540-7545
25. Riva, R., et al., Combination of ring-opening polymerization and "click chemistry": Toward functionalization and grafting of poly(epsilon-caprolactone), Macromolecules, 2007, 40(4): p. 796-803
26. Li, H. Y., et al., Combination of ring-opening polymerization and "click" chemistry for the synthesis of an amphiphilic tadpole-shaped poly(epsilon-caprolactone) grafted by PEO, Macromolecules, 2007, 40(4): p. 824-831
27. Rostovtsev, V. V., et al., A stepwise Huisgen cycloaddition process: Copper(I)-catalyzed regioselective "ligation" of azides and terminal alkynes, Angewandte Chemie-International Edition, 2002, 41(14): p. 2596-2599
28. Simmons, T. L. and G. L. Baker, Poly(phenyllactide): Synthesis, characterization, and hydrolytic degradation, Biomacromolecules, 2001, 2(3): p. 658-663
29. Liu, T. Q., et al., Synthesis and characterization of biodegradable "polystyrene" by ring opening polymerization, Macromolecules: p. in press
30. Yin, M. and G. L. Baker, Preparation and characterization of substituted polylactides, Macromolecules, 1999, 32(23): p. 7711-7718
31. Vogeley, N. J., G. L. Baker and M. R. Smith, III, Synthesis and polymerization of derivatized lactide monomers, Polymer Preprints (American Chemical Society, Division of Polymer Chemistry), 2005, 46(1): p. 336
32. Jiang, X., et al., Synthesis and polymerization of a novel amphiphilic lactide monomer, Polymeric Preprints (American Chemical Society, Division of Polymer Chemistry), 2005, 46(p. 1040)
33. Schmidt, M., et al., Preparation of some chiral aminodiols from tartaric acid—chiral lithium aluminum-hydride derivatives for asymmetric ketone reductions, Chemische Berichte-Recueil, 1980, 113(5): p. 1691-1707
34. Marti, M. J., et al., Synthesis of long-chain alkyl azides and their aggregation in formamide solutions, Tetrahedron Letters, 1989, 30(10): p. 1245-1248
35. O'Neil, E. J., K. M. DiVittorio and B. D. Smith, Phosphatidylcholine-derived bolaamphiphiles via click chemistry, Organic Letters, 2007, 9(2): p. 199-202
36. Bohlmann, F., P. Herbst and H. Gleinig, Polyacetylenverbindungen 30. Synthese von natürlich vorkommenden polyacetylenverbindungen mit endstandigen dreifachbindungen, Chemische Berichte-Recueil, 1961, 94(4): p. 948-957
37. Hasirci, V., et al., Nanobiomaterials: a review of the existing science and technology, and new approaches, Journal of Biomaterials Science-Polymer Edition, 2006, 17(11): p.
38. Kidchob, T., S. Kimura and Y. Imanishi, Thermo-responsive microcapsules using poly(N-isopropylacrylamide), Kobunshi Ronbunshu, 1998, 55(4): p. 192-199
39. Skwarczynski, M., Y. Hayashi and Y. Kiso, Paclitaxel prodrugs: Toward smarter delivery of anticancer agents, Journal Of Medicinal Chemistry, 2006, 49(25): p. 7253
40. Gil, E. S. and S. A. Hudson, Stimuli-reponsive polymers and their bioconjugates, Progress in Polymer Science, 2004, 29(12): p. 1173-1222
41. Tsuda, Y., et al., The use of patterned dual thermoresponsive surfaces for the collective recovery as co-cultured cell sheets, Biomaterials, 2005, 26(14): p. 1885-1893
42. Yang, J., et al., Cell sheet engineering: Recreating tissues without biodegradable scaffolds, Biomaterials, 2005, 26(33): p. 6415-6422
43. Cho, J. H., et al., Chondrogenic differentiation of human mesenchymal stem cells using a thermosensitive poly(N-isopropylacrylamide) and water-soluble chitosan copolymer, Biomaterials, 2004, 25(26): p. 5743-5751
44. Gonsalves, K. E., S. H. Jin and M. I. Baraton, Synthesis and surface characterization of functionalized polylactide copolymer microparticles, Biomaterials, 1998, 19(16): p.
45. Yang, H. and W. Y. J. Kao, Thermoresponsive gelatin/monomethoxy poly(ethylene glycol)-poly(D,L-lactide) hydrogels: Formulation, characterization, and antibacterial drug delivery, Pharmaceutical Research, 2006, 23(1): p. 205-214
46. Lutz, J. F. and A. Hoth, Preparation of ideal PEG analogues with a tunable thermosensitivity by controlled radical copolymerization of 2-(2-methoxyethoxy)ethyl methacrylate and oligo(ethylene glycol) methacrylate, Macromolecules, 2006, 39(2): p.
47. Lutz, J. F., O. Akdemir and A. Hoth, Point by point comparison of two thermosensitive polymers exhibiting a similar LCST: Is the age of poly(NIPAM) over?, Journal of the American Chemical Society, 2006, 128(40): p. 13046-13047
48. Zhao, B., et al., Synthesis of thermosensitive water-soluble polystyrenics with pendant methoxyoligo(ethylene glycol) groups by nitroxide-mediated radical polymerization, Macromolecules, 2005, 38(23): p. 9509-9517
49. Porjazoska, A., et al., Synthesis and aqueous solution properties of functionalized and thermoresponsive poly(D,L-lactide)/polyether block copolymers, Macromolecular Symposia, 2004, 210(p. 427-436
50. Han, S., M. Hagiwara and T. Ishizone, Synthesis of thermally sensitive water-soluble polymethacrylates by living anionic polymerizations of oligo(ethylene glycol) methyl ether methacrylates, Macromolecules, 2003, 36(22): p. 8312-8319
51. Zhong, Z. Y., et al., Synthesis and aqueous phase behavior of thermoresponsive biodegradable poly(D,L-3-methylglycolide)-block-poly(ethylene glycol)-block-poly(D,L-3-methylglycolide) triblock copolymers, Macromolecular Chemistry and Physics, 2002, 203(12): p. 1797-1803
52. Huh, K. M. and Y. H. Bae, Synthesis and characterization of poly(ethylene glycol)/poly(L-lactic acid) alternating multiblock copolymers, Polymer, 1999, 40(22): p. 6147-6155
53. Aoshima, S., H. Oda and E. Kobayashi, Synthesis of thermally-induced phase separating polymer with well-defined polymer structure by living cationic polymerization. 1. Synthesis of poly(vinyl ether)s with oxyethylene units in the pendant and its phase-separation behavior in aqueous-solution, Journal of Polymer Science Part A-Polymer Chemistry, 1992, 30(11): p. 2407-2413
54. Tachibana, Y., et al., Thermo- and pH-responsive biodegradable poly(alpha-N-substituted gamma-glutamine)s, Biomacromolecules, 2003, 4(5): p. 1132-1134
55. Shimokuri, T., T. Kaneko and M. Akashi, Specific thermosensitive volume change of biopolymer gels derived from propylated poly(gamma-glutamate)s, Journal of Polymer Science Part A-Polymer Chemistry, 2004, 42(18): p. 4492-4501
56. Watanabe, E. and N. Tomoshige, Preparation and physical properties of thermoresponsive biodegradable poly(asparagine) derivatives, Chemistry Letters, 2005, 34(6): p. 876-877
57. Schacht, E., et al., Polyacetal and poly(ortho ester)-poly(ethylene glycol) graft copolymer thermogels: Preparation, hydrolysis and FITC-BSA release studies, Journal of Controlled Release, 2006, 116(2): p. 219-225
58. Winzenburg, G., et al., Biodegradable polymers and their potential use in parenteral veterinary drug delivery systems, Advanced Drug Delivery Reviews, 2004, 56(10): p.

What is claimed is:

1. A poly(glycolide) polymer consisting of a polymerized alkynyl-substituted glycolide, the alkynyl-substituted glycolide comprising an alkynyl group.

2. The poly(glycolide) polymer of claim 1, wherein the alkynyl group contains 3 to 12 carbon atoms.

3. The poly(glycolide) polymer of claim 2, wherein the alkynyl group comprises a propargyl group having a terminal alkynyl group.

4. The poly(glycolide) polymer of claim 1, wherein the polymerized alkynyl-substituted glycolide comprises one or more repeating units according to Formula I

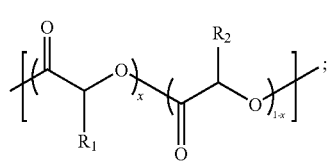

[Formula I]

wherein:
(i) $R_1$ comprises one or more moieties selected from a hydrogen, an alkyl group, an aryl group, and the alkynyl group;
(ii) $R_2$ comprises the alkynyl group; and,
(iii) x is between 0 and 1.

5. The poly(glycolide) polymer of claim 4, wherein the polymerized alkynyl-substituted glycolide comprises one or more polymeric chains according to Formula II

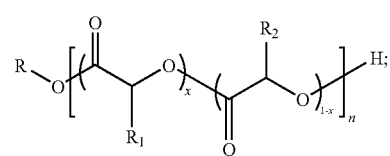

[Formula II]

wherein:
(i) $R_1$ comprises one or more moieties selected from a hydrogen, an alkyl group, an aryl group, and the alkynyl group;
(ii) $R_2$ comprises the alkynyl group;
(iii) R comprises a terminal group;
(iv) x ranges from 0 to less than 1; and,
(v) n ranges from about 10 to about 1000.

6. The poly(glycolide) polymer of claim 1, wherein the alkynyl-substituted glycolide comprises one or more monomers according to Formula III

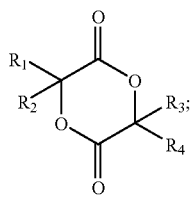

[Formula III]

wherein:
(i) $R_1$, $R_2$, $R_3$, and $R_4$ are independently selected from a hydrogen, an alkyl group, an aryl group, and the alkynyl group; and
(ii) at least one of $R_1$, $R_2$, $R_3$, and $R_4$ is the alkynyl group.

7. The poly(glycolide) polymer of claim 6, wherein the alkynyl-substituted glycolide is represented by Formula IIIa

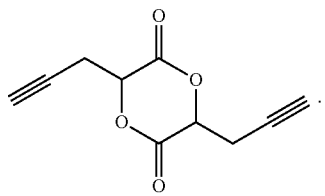

[Formula IIIa]

8. A functionalized poly(glycolide) polymer, comprising: a triazole reaction product of (a) a poly(glycolide) polymer comprising a polymerized alkynyl-substituted glycolide, the alkynyl-substituted glycolide comprising an alkynyl group and (b) an azide-substituted organic compound.

9. The functionalized poly(glycolide) polymer of claim 8, wherein the azide-substituted organic compound is selected from the group consisting of an azide-substituted polyoxyalkylene, an azide-substituted organic amine, an azide-substituted organic ammonium salt, an azide-substituted organic imine, an azide-substituted organic amide, an azide-substituted carboxylic acid, an azide-substituted carboxylate salt, an azide-substituted ester, an azide-substituted alkyl polyoxyalkylene, an azide-substituted alcohol, an azide-substituted alkane, an azide-substituted alkene, a diazido alkane, and combinations thereof.

10. The functionalized poly(glycolide) polymer of claim 8, wherein:
(i) the azide-substituted organic compound comprises an alkynyl-substituted alkane and an azide-substituted polyoxyalkylene; and
(ii) the functionalized poly(glycolide) polymer has a lower critical solution temperature (LCST) ranging from about 25° C. to about 65° C. and an LCST transition range of about 5° C. or less.

11. The poly(glycolide) polymer of claim 4, wherein $R_1$ and $R_2$ each comprise a propargyl group having a terminal alkynyl group.

12. The functionalized poly(glycolide) polymer of claim 8, wherein the alkynyl group of the alkynyl-substituted glycolide contains 3 to 12 carbon atoms.

13. The functionalized poly(glycolide) polymer of claim 8, wherein the alkynyl group of the alkynyl-substituted glycolide comprises a propargyl group having a terminal alkynyl group.

14. The functionalized poly(glycolide) polymer of claim 8, wherein the polymerized alkynyl-substituted glycolide comprises one or more repeating units according to Formula I

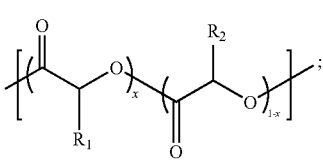

[Formula I]

wherein:
(i) $R_1$ comprises one or more moieties selected from a hydrogen, an alkyl group, an aryl group, and the alkynyl group;
(ii) $R_2$ comprises the alkynyl group; and,
(iii) x is between 0 and 1.

15. The functionalized poly(glycolide) polymer of claim 14, wherein the poly(glycolide) polymer further comprises lactide repeating units, thereby forming a copolymer selected from the group consisting of a random copolymer, a block copolymer, and combinations thereof.

16. The functionalized poly(glycolide) polymer of claim 14, wherein $R_1$ and $R_2$ each comprise a propargyl group having a terminal alkynyl group.

17. The functionalized poly(glycolide) polymer of claim 14, wherein the polymerized alkynyl-substituted glycolide comprises one or more polymeric chains according to Formula II

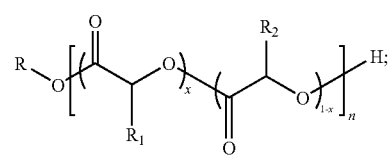

[Formula II]

wherein:
(i) $R_1$ comprises one or more moieties selected from a hydrogen, an alkyl group, an aryl group, and the alkynyl group;
(ii) $R_2$ comprises the alkynyl group;
(iii) R comprises a terminal group;
(iv) x ranges from a to less than 1; and,
(v) n ranges from about 10 to about 1000.

18. The functionalized poly(glycolide) polymer of claim 8, wherein the alkynyl-substituted glycolide comprises one or more monomers according to Formula III

[Formula III]

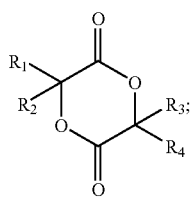

wherein:
(i) $R_1$, $R_2$, $R_3$, and $R_4$ are independently selected from a hydrogen, an alkyl group, an aryl group, and the alkynyl group; and
(ii) at least one of $R_1$, $R_2$, $R_3$, and $R_4$ is the alkynyl group.

19. The functionalized poly(glycolide) polymer of claim 18, wherein the alkynyl-substituted glycolide is represented by Formula IIIa

[Formula IIIa]

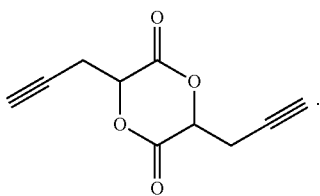

20. A poly(glycolide) copolymer consisting of repeat units of an alkynyl substituted glycolide and of a lactide, wherein the copolymer is a random copolymer or a block copolymer.

* * * * *